(12) United States Patent
Kumagae et al.

(10) Patent No.: US 6,408,518 B1
(45) Date of Patent: Jun. 25, 2002

(54) METHOD AND APPARATUS FOR ASSEMBLING BALLS FORMING BALL SPLINE OF TOROIDAL-TYPE CONTINUOUSLY VARIABLE TRANSMISSION

(75) Inventors: Mitsuo Kumagae, Saitama; Ryota Iwahashi, Kanagawa, both of (JP)

(73) Assignee: NSK Ltd., Tokyo (JP)

( * ) Notice: Subject to any disclaimer, the term of this patent is extended or adjusted under 35 U.S.C. 154(b) by 62 days.

(21) Appl. No.: 09/697,649

(22) Filed: Oct. 27, 2000

(30) Foreign Application Priority Data

Oct. 28, 1999 (JP) .......................................... 11-306931

(51) Int. Cl.$^7$ ........................... B21D 53/10; F16H 15/38
(52) U.S. Cl. ................. 29/898.03; 29/407.09; 476/40; 476/42
(58) Field of Search .................. 29/407.09, 898.03; 476/40, 42; 403/359.1

(56) References Cited

U.S. PATENT DOCUMENTS

| | | | | |
|---|---|---|---|---|
| 5,794,339 A | * | 8/1998 | Pearson et al. | .......... 29/407.09 |
| 5,899,827 A | * | 5/1999 | Nakano et al. | ................ 476/40 |
| 6,206,801 B1 | * | 3/2001 | Ishikawa et al. | .............. 476/42 |

FOREIGN PATENT DOCUMENTS

| | | | | |
|---|---|---|---|---|
| JP | 62-71465 | | 5/1987 | ............ F16H/15/38 |
| JP | 1-173552 | | 12/1989 | ............ F16H/15/38 |
| JP | 7-164264 | | 6/1995 | ............ B23P/21/00 |
| JP | 8-99235 | * | 4/1996 | |
| JP | 11-51135 | | 2/1999 | ............ F16H/15/38 |
| JP | 11-247953 | | 9/1999 | ............ F16H/15/38 |

* cited by examiner

Primary Examiner—Allan D. Herrmann
(74) Attorney, Agent, or Firm—Sughrue Mion, PLLC

(57) ABSTRACT

Using a phase matching device 59, the phases of the outside diameter side and inside diameter side ball spline grooves 46, 47 are matched to each other and such phase matched state is maintained as it is. A given number of balls are supplied to between the two ball spline grooves 46, 47 through openings formed in the upper end portions of spaces existing therebetween by a ball supply device 64. An input shaft 15 and an input side disk 2B are shifted reciprocatingly with respect to each other in the axial direction thereof and in the circumferential direction thereof using a lift board 54, a center pin 56, and a swing device 72. As a result of the relatively shifting operation of the input shaft 15 and input side disk 2B, the balls are allowed to drop into the lower portions of spaces respectively defined by and between the two ball spline grooves 46, 47 due to the influence of gravity, that is, due to their own weights.

5 Claims, 18 Drawing Sheets

METHOD AND APPARATUS FOR ASSEMBLING BALLS FORMING BALL SPLINE OF TOROIDAL-TYPE CONTINUOUSLY VARIABLE TRANSMISSION

BACKGROUND OF THE INVENTION

1. Field of the Invention

The present invention relates to method and apparatus for assembling balls forming a ball spline of a toroidal-type continuously variable transmission, and such method and apparatus are used to facilitate the assembling operation of a toroidal-type continuously variable transmission as a transmission unit for a transmission for a car or a transmission for various kinds of industrial machines.

2. Description of the Related Art

Conventionally, as a transmission unit for a transmission for a car, it has been studied to use such a toroidal-type continuously variable transmission as schematically shown in FIGS. 12 and 13. In this toroidal-type continuously variable transmission, for example, as disclosed in JP-A-62-71465U, an input side disk 2 (a power transmission disk) is supported concentrically with an input shaft 1 (a rotary shaft), while an output side disk 4 (a power transmission disk) is fixed to the end portion of an output shaft 3 (a rotary shaft) which is disposed concentrically with the input shaft 1. In the interior portion of a casing in which the toroidal-type continuously variable transmission is stored, there are disposed trunnions 6, 6 which can be respectively swung about their associated pivot shafts 5, 5 arranged at positions along an imaginary plane that is perpendicular to an imaginary line connecting the respective axes of the input and output shafts 1 and 3, and distanced from the intersection of the imaginary plane and imaginary line, as shown in FIG. 12. This physical relation is hereinafter referred to as "torsional relation (torsional position)".

That is, these trunnions 6, 6 are structured such that the pivot shafts 5, 5 are disposed on the outer surfaces of their respective two end portions. Also, in the middle portions of the respective trunnions 6, 6, there are supported the base end portions of displacement shafts 7, 7 in such a manner that the inclination angles of the displacement shafts 7, 7 can be freely adjusted by swinging the trunnions 6, 6 about the pivot shafts 5, 5. In the peripheries of the respective displacement shafts 7, 7, there are rotatably supported power rollers 8, 8, respectively. And, these power rollers 8, 8 are held by and between the mutually opposing inner surfaces 2a, 4a of the input side and output side disks 2, 4. Each of the inner surfaces 2a, 4a is formed such that its cross section is formed as a concave surface which can be obtained by rotating an arc about its associated pivot shaft 5. Also, the power rollers 8, 8 respectively include peripheral surfaces 8a, 8a each of which is formed as a spherical-shaped convex surface, while the peripheral surfaces 8a, 8a are respectively contacted with the inner surfaces 2a, 4a.

Between the input shaft 1 and input side disk 2, there is interposed a pressing device 9 of a loading cam type, while the input side disk 2 can be elastically pressed toward the output side disk 4 by the pressing device 9. The pressing device 9 is composed of a cam plate 10 rotatable together with the input shaft 1 and a plurality of (for example, four) rollers 12, 12 which are rollably held by a retainer 11. On one side surface (in FIGS. 12 and 13, on the left side surface) of the cam plate 10, there is formed a cam surface 13 which is a curved surface extending in the circumferential direction of the cam plate 10; and, on the outer side surface (in FIGS. 12 and 13, on the right side surface) of the input side disk 2 as well, there is formed a similar cam surface 14. And, the plurality of rollers 12, 12 are respectively supported in such a manner that they can be rotated about axes respectively extending radially with respect to the input shaft 1.

When the above-structured toroidal-type continuously variable transmission is in use, in case where the cam plate 10 is rotated in response to the rotation of the input shaft 1, the cam surface 13 presses the plurality of rollers 12, 12 against the cam surface 14 formed on the outer side surface of the input side disk 2. As a result of this, the input side disk 2 is pressed by the plurality of power rollers 8, 8 and, at the same time, in accordance with the mutually pressing actions between the pair of cam surfaces 13, 14 and the plurality of rollers 12, 12, the input side disk 2 is rotated. And, the rotational movement of the input side disk 2 is transmitted through the plurality of power rollers 8, 8 to the output side disk 4, so that the output shaft 3 fixed to the output side disk 4 is rotated.

Referring here to cases where a rotation speed ratio (a transmission ratio) between the input shaft 1 and output shaft 3 is changed, at first, in case where the rotation speed ratio is decreased between the input shaft 1 and output shaft 3, the trunnions 6, 6 may be respectively swung in a given direction about their associated pivot shafts 5, 5. And, the displacement shafts 7, 7 may be respectively inclined so that the peripheral surfaces 8a, 8a of the power rollers 8, 8, as shown in FIG. 12, can be respectively contacted with the near-to-center portion of the inner surface 2a of the input side disk 2 and the near-to-outer-periphery portion of the inner surface 4a of the output side disk 4. On the other hand, in case where the rotation speed ratio is increased between the input shaft 1 and output shaft 3, the trunnions 6, 6 may be respectively swung in the opposite direction about their associated pivot shafts 5, 5. And, the displacement shafts 7, 7 may be respectively inclined so that the peripheral surfaces 8a, 8a of the power rollers 8, 8, as shown in FIG. 13, can be respectively contacted with the near-to-outer-periphery portion of the inner surface 2a of the input side disk 2 and the near-to-center portion of the inner surface 4a of the output side disk 4. Also, in case where the inclination angles of the displacement shafts 7, 7 are set at the intermediate angles between the angles shown in FIGS. 12 and 13, there can be obtained an intermediate rotation speed ratio between the input shaft 1 and output shaft 3.

Also, FIGS. 14 and 15 show a more specified example of a conventional toroidal-type continuously variable transmission which is disclosed in JP-A-1-173552U. In the present conventional toroidal-type continuously variable transmission, an input side disk 2 and an output side disk 4 are respectively supported on the periphery of a circularpipe-shaped input shaft 15 in such a manner that they can be rotated and shifted in the axial direction of the input shaft 15 through needle roller bearings 16, 16. Also, a cam plate 10 is spline engaged with the outer peripheral surface of the end portion (in FIG. 14, the left end portion) of the input shaft 15, so that a collar portion 17 can prevent the cam plate 10 from moving in a direction to part away from the input side disk 2. And, the cam plate 10 and rollers 12, 12 cooperate together in forming a pressing device 9 of a loading cam type which, based on the rotational movement of the input shaft 15, can press and rotate the input side disk 2 toward the output side disk 4. An output gear 18 is connected to the output side disk 4 through keys 19, 19, so that the output side disk 4 and output gear 18 can be rotated in synchronization with each other.

The respective two end portions of a pair of trunnions 6, 6 are supported on a pair of support plates 20, 20 in such a manner that they can be swung and shifted in the axial direction thereof (in FIG. 14, in the front and back direction; and, in FIG. 15, in the right and left direction). And, displacement shafts 7, 7 are respectively supported on circular holes 23, 23 portions which are formed in the middle portions of the respective trunnions 6, 6. These displacement shafts 7, 7 respectively include support shaft portions 21, 21 and pivot shaft portions 22, 22 which are arranged in parallel to each other and are shifted in the axes from each other in the axes thereof. Of these support shaft portions, the support shaft portions 21, 21 are rotatably supported on the interior portions of the respective circular holes 23, 23 through their associated radial needle roller bearings 24, 24. On the other hand, on the peripheries of the respective pivot shaft portions 22, 22, there are rotatably supported power rollers 8, 8 through another radial needle roller bearings 25, 25.

By the way, the pair of displacement shafts 7, 7 are respectively disposed at the 180° opposite positions with respect to the input shaft 15. Also, directions in which the pivot shaft portions 22, 22 of these displacement shafts 7, 7 are respectively shifted with respect to the support shaft portions 21, 21 are the same (in FIG. 15, the reversed right and left direction) with respect to the rotational direction of the input side and output side disks 2, 4. And, this shifting direction is set to be almost perpendicular to a direction where the input shaft 15 is disposed. Therefore, the power rollers 8, 8 are supported in such a manner that they can be shifted slightly with respect to the arranging direction of the input shaft 15. As a result of this, even in case where the power rollers 8, 8 tend to shift in the axial direction of the input shaft 15 (in FIG. 14, in the right and left direction; and, in FIG. 15, in the front and back direction) due to the elastic deformation of the component members of the present toroidal-type continuously variable transmission caused by large loads are applied to the component members during transmission of the rotational force, such shifts of the power rollers 8, 8 can be absorbed without applying excessive forces to the component members.

Also, between the outer surfaces of the respective power rollers 8, 8 and the inner surfaces of the middle portions of the respective trunnions 6, 6, there are disposed thrust ball bearings 26, 26 and thrust needle roller bearings 27, 27 in order starting from the outer surfaces of the power rollers 8, 8. Of these bearings, the thrust ball bearings 26, 26 respectively support the thrust-direction loads applied to their associated power rollers 8, 8 and also allow their associated power rollers 8, 8 to rotate. Also, the thrust needle roller bearings 27, 27 respectively support the thrust-direction loads applied to their associated outer races 30, 30 respectively forming the thrust ball bearings 26, 26 and also allow the pivot shaft portions 22, 22 and outer races 30, 30 to swing about their associated support shaft portions 21, 21.

Further, to the one-end portions (in FIG. 15, the left end portions) of the respective trunnions 6, 6, there are respectively connected their associated drive rods 36, 36; and, to the outer peripheral surfaces of the middle portions of the respective drive rods 36, 36, there are fixedly secured drive pistons 37, 37. And, these drive pistons 37, 37 are respectively fitted into their associated drive cylinders 38, 38 in an oil tight manner.

In the case of the above-structured toroidal-type continuously variable transmission, the rotation power of the input shaft 15 is transmitted through the pressing device 9 to the input side disk 2. And, the rotational movement of the input side disk 2 is transmitted through the pair of power rollers 8, 8 to the output side disk 4 and, further, the rotational movement of the output side disk 4 is taken out from the output gear 18. To change the rotation speed ratio between the input shaft 15 and output gear 18, the pair of drive pistons 37, 37 may be shifted in the mutually opposite directions. Due to the shifting movements of these drive pistons 37, 37, the pair of trunnions 6, 6 are respectively shifted in the mutually opposite directions, so that, for example, the power roller 8 disposed in a lower stage in FIG. 15 is shifted to the right, whereas the power roller 8 disposed in an upper stage in FIG. 15 is shifted to the left. This changes the direction of a tangential-direction force which acts on the contact portions between the peripheral surfaces 8a, 8a of the respective power rollers 8, 8 and the inner surfaces 2a, 4a of the input side and output side disks 2, 4. And, as a result of this change in the direction of the force, the respective trunnions 6, 6 are swung in the mutually opposite directions about their associated pivot shafts 5, 5 which are pivotally supported on the support plates 20, 20. As a results, as previously shown in FIGS. 12 and 13, the contact positions between the peripheral surfaces 8a, 8a of the respective power rollers 8, 8 and the inner surfaces 2a, 4a of the input side and output side disks 2, 4 are changed, thereby changing the rotation speed ratio between the input shaft 15 and output gear 18.

By the way, when the rotational force is transmitted between the input shaft 15 and output gear 18 in this manner, due to the elastic deformation of the component members of the toroidal-type continuously variable transmission, the power rollers 8, 8 are respectively shifted in the axial direction of the input shaft 15 and thus the displacement shafts 7, 7 pivotally supporting the power rollers 8, 8 are slightly rotated about the support shaft portions 21, 21. As a result of the rotational movements of the displacement shafts 7, 7, the outer surfaces of the outer races 30, 30 of the thrust ball bearings 26, 26 and the inner surfaces of the trunnions 6, 6 are caused to shift with respect to each other. Because the thrust needle roller bearings 27, 27 are present between these outer and inner surfaces, this relative shifting motion requires only a small force. Therefore, to change the inclination angles of the displacement shafts 7, 7 in the above-mentioned manner requires only a small force.

Further, for the purpose of increasing the torque that can be transmitted, as shown in FIGS. 16 and 17, conventionally, there are also known structures in which input side disks 2A, 2B and output side disks 4, 4 respectively serving as power transmission disks are disposed by twos on the periphery of an input shaft 15 which is a rotary shaft; and, the two input side disks 2A, 2B and two output side disks 4, 4 are arranged in parallel to each other with respect to the direction of transmission of the power. In each of the structures shown in FIGS. 16 and 17, an output gear 18a is supported on the periphery of the middle portion of the input shaft 15 in such a manner that it can be rotated with respect to the input shaft 15, while the output side disks 4, 4 are respectively spline engaged with the two end portions of a cylindrical portion provided on the central portion of the output gear 18. And, between the inner peripheral surfaces of the output side disks 4, 4 and the outer peripheral surfaces of the input shaft 15, there are interposed needle roller bearings 16, 16; and, the output side disks 4, 4 are respectively supported on the periphery of the input shaft 15 in such a manner that they can be rotated with respect to the input shaft 15 as well as can be shifted in the axial direction of the input shaft 15. Also, the input side disks 2A, 2B are respectively supported on the two end portions of the input shaft 15 in such a manner that they can be rotated together with the input shaft 15.

However, one (in FIGS. 16 and 17, the left side) input side disk 2A is disposed such that its back surface (in FIGS. 16 and 17, the left side surface) is butted against a loading nut 39 directly (in the case of the structure shown in FIG. 17) or through a coned disk spring 45 having large elasticity (in the case of the structure shown in FIG. 16), whereby the input side disk 2A is substantially prevented from shifting in its axial direction (in FIGS. 16 and 17, in the right and left direction) with respect to the input shaft 15. On the other hand, the input side disk 2B disposed opposed to the cam plate 10 is supported on the input shaft 15 through a ball spline 40 in such a manner that it can be shifted in its axial direction. And, between the back surface (in FIGS. 16 and 17, the right surface) of the input side disk 2B and the front surface (in FIGS. 16 and 17, the left surface) of the cam plate 10, there are interposed a coned disk spring 41 and a thrust needle roller bearing 42 in such a manner that they are arranged in series with each other. Of the two component members, the coned disk spring 41 is used to apply a preload to the contact portions between the inner surfaces 2a, 4a of the disks 2A, 2B and the peripheral surfaces 8a, 8a of the power rollers 8, 8. On the other hand, the thrust needle roller bearings 42, when the pressing device 9 is in operation, allows the input side disk 2B and cam plate 10 to rotate with respect to each other.

Also, in the case of the structure shown in FIG. 16, the output gear 18a is rotatably supported on a partition wall 44 provided in the interior portion of the housing by a pair of angular type ball bearings 43, 43, whereas the output gear 18a is prevented from shifting in the axial direction thereof. On the other hand, in the structure shown in FIG. 17, the output gear 18a is free to shift in the axial direction thereof. By the way, as shown in FIGS. 16 and 17, the reason why, in the toroidal-type continuously variable transmission of a so called double cavity type that the input side disks 2A, 2B and output side disks 4, 4 are disposed by twos in parallel to each other with respect to the power transmission direction, one or both of the input side disks 2A, 2B facing the cam plate 10 is or are supported on the input shaft 15 by the ball splines 40, 40a in such a manner as to be shifted in the axial direction thereof is to fulfill the following functions (1) and (2):

(1) the rotational movements of these two disks 2A, 2B are synchronized with each other perfectly; and, (2) in addition to the above function (1), the two disks 2A, 2B are allowed to shift in the axial direction thereof with respect to the input shaft 15 in accordance with the elastic deformation of the component members of the toroidal-type continuously variable transmission caused by the operation of the pressing device 9.

The ball splines 40, 40a, which are disposed for the above purpose, respectively include outside diameter side ball spline grooves 46, 46 formed in the axial direction thereof at a plurality of circumferential-direction positions on the outer peripheral surface of the middle portion of the input shaft 15, inside diameter side ball spline grooves 47, 47 formed in the axial direction thereof at positions facing the outside diameter side ball spline grooves 46, 46 on the inner peripheral surfaces of the input side disks 2A, 2B, and a plurality of balls 48, 48 rollably interposed between these two kinds of ball spline grooves 46, 47. Also, in the case of the ball spline 40 which is used to support the input side disk 2B positioned on the pressing device 9 side, a securing ring 50 is secured to a securing groove 49 formed in the near-to-inner-surface 2a portion of the inner peripheral surface of the input side disk 2B, thereby preventing the plurality of balls 48, 48 from shifting toward the inner surface 2a of the input side disk 2B. And, the balls 48, 48 are thereby prevented from slipping out from between the two kinds of inner and outer diameter side ball spline grooves 46, 47. By the way, in the structure of FIG. 16, in the case of the ball spline 40a for supporting the input side disk 2A situated far from the pressing device 9, a securing ring 50a is secured to a securing groove 49a formed in the outer peripheral surface of the middle portion of the input shaft 15, thereby preventing the plurality of balls 48, 48 from shifting toward the inner surface 2a of the input side disk 2A.

Also, in JP-A-11-51135, there is disclosed a structure in which there are eliminated troubles in securing securing rings 50a, 50a to the above-mentioned securing grooves 49, 49 to thereby be able to reduce the manufacturing cost of a toroidal-type continuously variable transmission. FIGS. 18 to 22 respectively show the main portions of the toroidal-type continuously variable transmission that is disclosed in this publication. In this toroidal-type continuously variable transmission, on the outer peripheral surface of the middle portion of the input shaft 15, in more particular, on the portion of the present outer peripheral surface between the input side disk 2B and the output side disk 4 to which the input side disk 2B is opposed, there is formed a small-diameter portion 51 over the whole periphery thereof. A level difference h (see FIG. 19), which exists between the outer peripheral surface of the small-diameter portion 51 and the portion of the outer peripheral surface of the input shaft 15 that is deviated from the small-diameter portion 51, is set larger than the diameter-direction width $W_{50}$ of the securing ring 50 ($h > W_{50}$). By the way, the securing ring 50 is formed of elastic material such as stainless spring steel or synthetic resin having oil resistance and heat resistance in a partially cutaway ring shape and is provided with elasticity in a direction to spread the diameter thereof in a free state.

On the other hand, in the portion of the inner peripheral surface of the input side disk 2B that is situated near to the inner surface 2a (in FIGS. 18 to 22, near to the left side) of the input side disk 2B, there is formed a securing groove 49 over the whole periphery thereof in such a manner that it crosses perpendicularly inside diameter side ball spline grooves 46, 46 respectively formed in the inner peripheral surface of the input side disk 2B. The securing ring 50 is mounted into the securing groove 49 through the small-diameter portion 51 in such a manner that the inside diameter side opening of the securing groove 49 and the small-diameter portion 51 are matched to each other. Also, in the portion of the outer peripheral surface of the middle portion of the input shaft 15 that is situated on the opposite side end portion of the outside diameter side ball spline grooves 46, 46 with respect to the small-diameter portion 51, there is formed a securing groove 49a; and, a securing ring 50a is mounted into this securing groove 49a. The securing ring 50a, oppositely to the securing ring 50, has elasticity in a direction to shorten the outside diameter thereof in a free state. And, the securing ring 50a has a function to prevent the plurality of balls 48, 48 from slipping out toward the outer surface (in FIGS. 18 to 22, the right side surface) of the input side disk 2B.

In the case of the above-structured toroidal-type continuously variable transmission, after the input side disk 2B is fitted with the outer surface of the input shaft 15, there can be carried out an operation to insert the plurality of balls 15 48, 48 forming the ball spline 40 into between the outside and inside diameter side ball spline grooves 46, 47, and an operation to mount the securing ring 50 onto the inner peripheral surface of the input side disk 2B. That is, an operation to assemble the above-mentioned structure is executed in the following manner. By the way, this assembling operation is carried out with the inner surface 2a of the input side disk 2B facing upward. This is preferable because gravity acts in a direction to calm down the component members of the toroidal-type continuously variable transmission.

In the securing groove 49a formed in the outer peripheral surface of the middle portion of the input shaft 15, there has been previously mounted the securing ring 50a. In this state, there is no possibility that the outer peripheral edge of the securing ring 50a can project out from the outer peripheral surface of the input shaft 15. Then, the component members of the pressing device 9 and input side disk 2B are fitted with the outer peripheral surface of the input shaft 15. At the then time, the securing ring 50 is not yet mounted on the input side disk 2B. And, in a state where the input side disk 2B is fitted with the outer peripheral surface of the input shaft 15 and the outside and inside diameter side ball spline grooves 46, 47 are matched to each other, the plurality of balls 48, 48 are inserted into between the outside and inside diameter side ball spline grooves 46, 47.

Next, as shown in FIG. 20, the input side disk 2B is moved in the axial direction of the input shaft 15 and the inside diameter side opening of the securing groove 49 is opened to the small-diameter portion 51. And, the securing ring 50 is fitted through the small-diameter portion 51 into the portion of the input side disk 2B that is situated near to the inner surface of the inner peripheral surface of the input side disk 2B, and the securing ring 50 is matched to the securing groove 49. Due to the elasticity of the securing ring 50 itself, as shown in FIG. 21, the securing ring 50 is engaged with the securing groove 49. By the way, when mounting the securing ring 50 into the securing groove 49 in this manner, the balls 48, 48 in contact with the securing ring 50a must be prevented from being exposed from the outer surface of the input side disk 2B, or, even when the balls are exposed, they must be exposed less than half of the diameter thereof. The reason for this consideration is that, in the mounting operation of the securing ring 50, the balls 48, 48 can be prevented from slipping out from the outer surface of the input side disk 2B.

After the securing ring 50 is mounted into the securing groove 49 in the above-mentioned manner, as shown in FIG. 22, the input side disk 2B is returned to the opposite side of the axial direction of the input shaft 15. Due to this, the securing groove 49 is shifted from the small-diameter portion 51 and the securing ring 50 is thereby prevented from slipping out from the securing groove 49. In the case of the toroidal-type continuously variable transmission that is structured and operates in the above-mentioned manner, there is eliminated the need for extra operations such as an operation to adhere the plurality of balls 48, 48 to the outside diameter side ball spline grooves 47, 47, which can facilitate the assembling operation of the toroidal-type continuously variable transmission.

However, in the case of the structure disclosed in the above-mentioned publication JP-A-11-51135, although the assembling operation of the balls 48, 48 can be facilitated, automation of this assembling operation has not been taken into consideration yet. Also, actually, in order to be able to assemble the structure disclosed in the above-mentioned publication by an automation device, in case where the balls 48, 48 are to be assembled between the two ball spline grooves 46, 47, special attention should be paid to the following point. That is, to assemble the balls 48, 48 between the two ball spline grooves 46, 47, the balls 48, 48 are inserted into cylindrical-shaped spaces respectively defined by and between the two ball spline grooves 46, 47 through openings formed in the respective one-end portions of these cylindrical-shaped spaces. However, since the diameters of these cylindrical-shaped spaces are substantially equal to or slightly larger than the diameter of the balls 48, 48, the rolling surfaces of the balls 48, 48 inserted in the above manner are easy to be frictionally engaged with the two ball spline grooves 46, 47. Due to such frictional engagement, there is a possibility that the balls 48, 48 cannot be fed up to the deep portions of the cylindrical-shaped spaces, which makes it impossible to carry out the mounting operation of the balls 48, 48 and securing ring 50. Therefore, it is desired to provide means which is positively able to feed the balls 48, 48 up to the deep portions of the cylindrical-shaped spaces even in case where the above frictional engagement is easy to occur.

On the other hand, in JP-A-7-164264, there is disclosed an invention relating to an apparatus for automatically assembling a ball spline. However, in the case of the assembling apparatus disclosed in this publication, before an outside member including an inside diameter side ball spline groove formed in the inner peripheral surface thereof is fitted with the outer surface of a shaft member including an outside diameter side ball spline groove formed in the outer peripheral surface thereof, a plurality of balls are previously secured to the present outside diameter side ball spline groove. Due to this, the mechanism of the assembling apparatus is complicated, which makes it difficult to put the assembling apparatus into actual operation (enforcement).

SUMMARY OF THE INVENTION

The present invention aims at eliminating the above drawbacks found in the conventional methods and apparatus for assembling balls forming the ball spline of a toroidal-type continuously variable transmission. Accordingly, it is an object of the invention to provide method and apparatus for assembling balls forming the ball spline of a toroidal-type continuously variable transmission which are surely able to facilitate the assembling operation of balls forming the ball spline of a toroidal-type continuously variable transmission.

In attaining the above object, according to the invention, there are provided method and apparatus for assembling balls forming a ball spline of a toroidal-type continuously variable transmission, in which, for assembly of a ball spline through which a power transmission disk can be supported on the periphery of the middle portion of a rotary shaft forming a toroidal-type continuously variable transmission in such a manner that the power transmission disk can be shifted with respect to the rotary shaft only in the axial direction thereof, a plurality of balls forming the ball spline are supplied and assembled between each of a plurality of outside diameter side ball spline grooves respectively formed at a plurality of circumferential-direction portions of the outer peripheral surface of the middle portion of the rotary shaft in the axial direction thereof and each of a plurality of inside diameter side ball spline grooves respectively formed at a plurality of circumferential-direction portions of the inner peripheral surface of the power transmission disk in the axial direction thereof so as to face the outside diameter side ball spline grooves.

Of the above-mentioned method and apparatus for assembling balls forming a ball spline of a toroidal-type continuously variable transmission according to the invention, in the method according to one aspect of the invention, in a state where the rotary shaft is disposed in the vertical direction, the power transmission disk is disposed on the periphery of the middle portion of the rotary shaft, and the outside diameter ball spline grooves and the inside diameter ball spline grooves are matched in phase to each other. Also, there is assembled a member which is used to prevent the balls from slipping out from the lower end openings of a plurality of cylindrical-shaped spaces respectively defined by and between the outside diameter side and inside diameter side ball spline grooves. And, in this state, after the balls are supplied by a given number into each of the cylindrical-shaped spaces through the upper end openings of the cylindrical-shaped spaces, the rotary shaft and power transmission disk are shifted reciprocatingly with respect to each other in at least one direction of the circumferential direction thereof and the axial direction thereof to thereby feed the given number of balls into the lower portion of each of the cylindrical-shaped spaces.

Also, the apparatus according to a second aspect of the invention includes: a first support member for supporting the rotary shaft in a state where the rotary shaft is disposed in the vertical direction; a second support member for supporting the power transmission disk in a state where the power transmission disk is disposed on the periphery of the middle portion of the rotary shaft; a vertically shifting unit for shifting one of the first and second support members in the vertical direction; a phase matching unit for matching the phases of the inside diameter side and outside diameter side ball spline grooves to each other and also for maintaining such phase matched state; a ball supply unit for supplying the balls by a given number into each of a plurality of cylindricalshaped spaces respectively defined by and between the outside diameter side and inside diameter side ball spline grooves through the upper end openings of the cylindrical-shaped spaces; and, a swing unit for shifting at least one of the rotary shaft and power transmission disk reciprocatingly with respect to each other in the circumferential direction thereof.

As described above, in the case of the method and apparatus for assembling balls forming a ball spline of a toroidal-type continuously variable transmission according to the invention, when carrying out the ball assembling operation, in a state where the rotary shaft and power transmission disk are disposed in the vertical direction, after the balls are supplied into the cylindrical-shaped spaces respectively defined by and between the outside diameter side and inside diameter side ball spline grooves through the upper end openings of these cylindrical-shaped spaces, the rotary shaft and power transmission disk are shifted reciprocatingly with respect to each other in at least one direction of the circumferential direction thereof and the axial direction thereof. Due to this operation, there is prevented a possibility that, between the surfaces of the balls and the inner surfaces of the outside diameter side and inside diameter side ball spline grooves, there can remain such frictional forces as can prevent the balls from moving downwardly. As a result of this, due to the gravity that acts on these balls, these balls are fed into the lower portions (deep portions) of the respective cylindrical-shaped spaces. In this manner, in the case of the invention, in spite of the fact that the surfaces of the balls and the inner surfaces of the outside diameter side and inside diameter side ball spline grooves can be frictionally engaged with each other easily, there can be prevented an inconvenience that the balls can be caused to stop in the intermediate portions of the cylindrical-shaped spaces (that is, the balls are prevented from being fed into the deep portions of the cylindrical-shaped spaces). Thanks to this, the balls can be positively assembled into the respective cylindrical-shaped spaces. Also, of the aspects of the invention, according to the ball assembling apparatus as set forth in the second aspect of the invention, the above-mentioned ball assembling operation can be executed automatically. This eliminates a troublesome operation supplying the plurality of balls through the upper end openings of the respective cylindrical-shaped spaces. Also, the mechanism of the present ball assembling apparatus does not become complicated but can be made compact, which makes it possible to facilitate the incorporation of the present ball assembling apparatus into the manufacturing line of a toroidal-type continuously variable transmission.

DETAILED DESCRIPTION OF THE PREFERRED EMBODIMENTS

Now, FIGS. 1 to 11 respectively show an embodiment of a mode for carrying out the invention. By the way, the present invention is characterized by method and apparatus for assembling balls 48, 48 forming a ball spline 40 of a toroidal-type continuously variable transmission. Since the structure and operation of the toroidal-type continuously variable transmission including the ball spline 40 are similar to those of the conventional structures respectively shown in the previously described FIGS. 16, 17 and FIGS. 18–22, duplicate illustration and description are omitted or simplified here. That is, a description will be given below mainly of the characteristic portions of the present invention.

Figure 1:
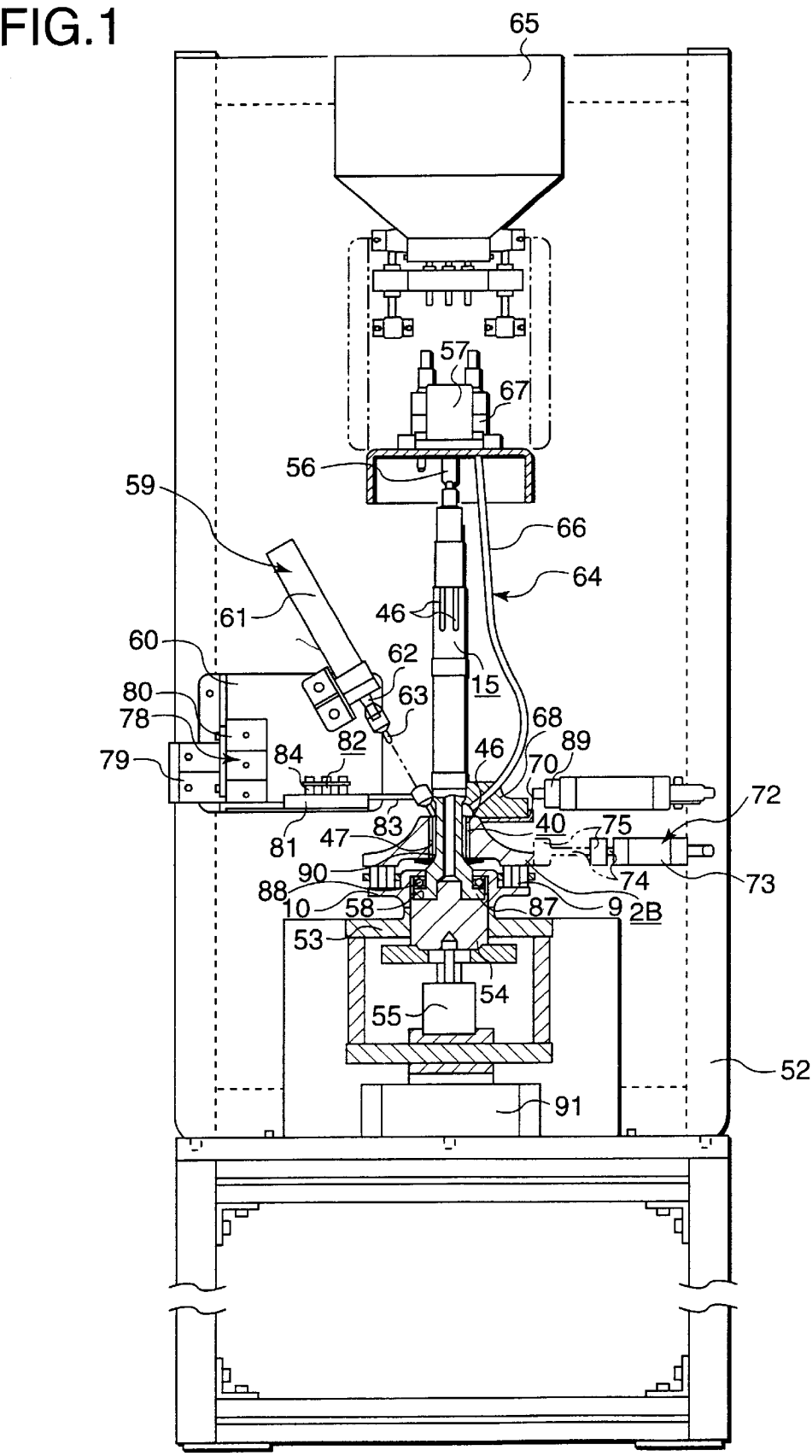
FIG. 1 is a partially longitudinal front view of the whole structure of a ball assembling apparatus according to a first embodiment of the invention.
Figure 2:
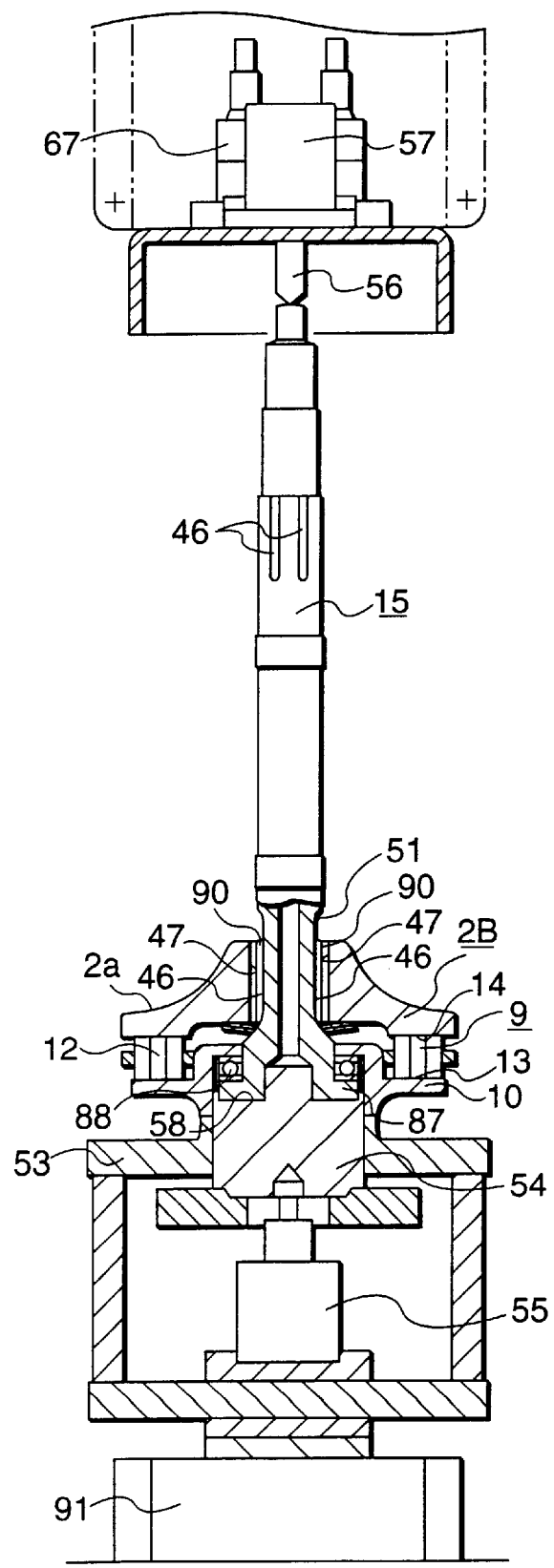
FIG. 2 is a partially cutaway enlarged front view of an input shaft and input side disk support portion of the present ball assembling apparatus.
Figure 3:
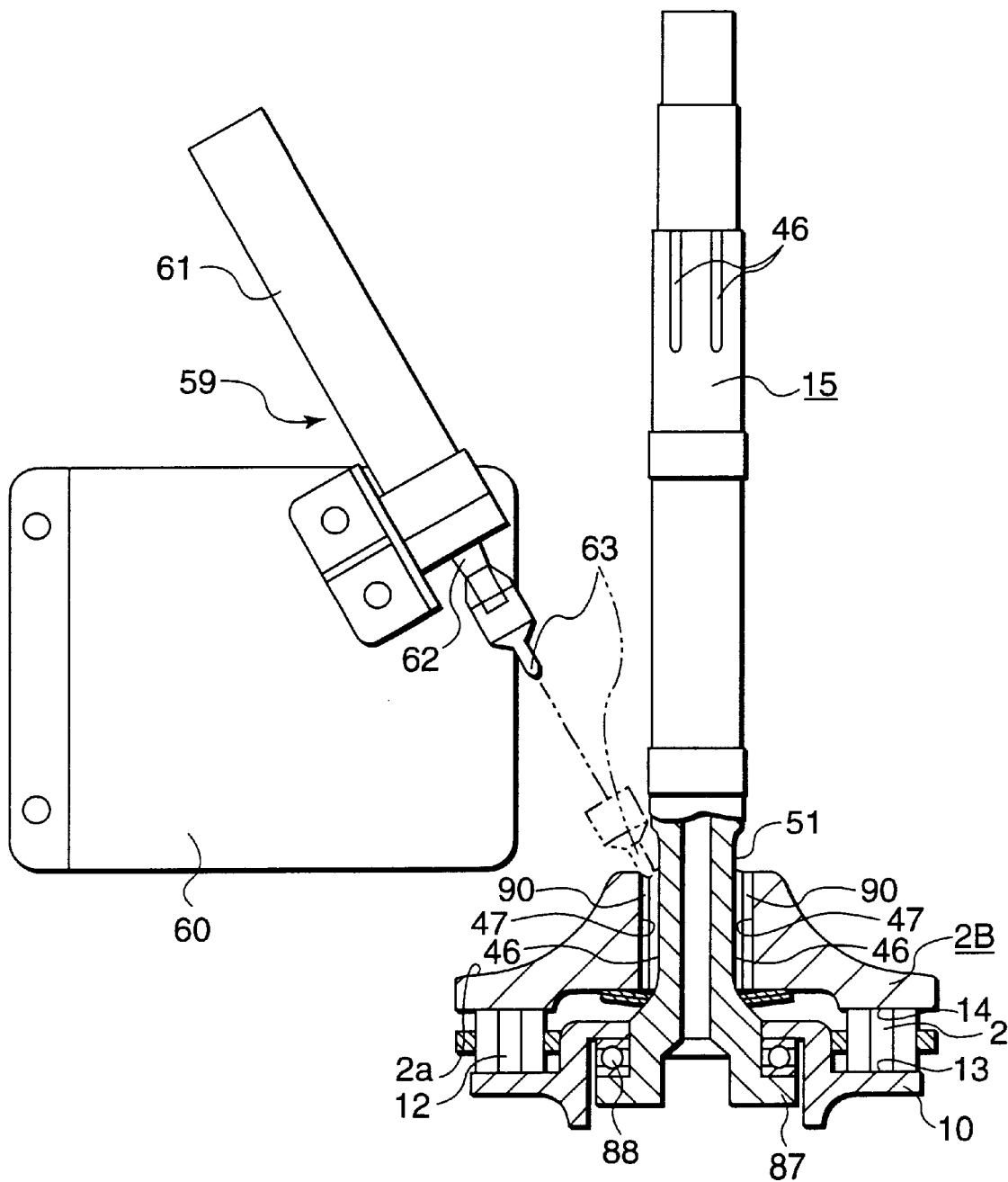
FIG. 3 is a partially cutaway enlarged front view of the input shaft, input side disk and phase matching means of the present ball assembling apparatus.

A ball assembling apparatus according to the invention has such whole structure as shown in FIG. 1. Specifically, in the middle portion of a support frame 52 which is to be fixed onto the floor of a factory, as shown in detail in FIG. 2, a rotary board 53 serving as a second support member, and a lift board 54 serving as a first support member which is liftably and lowerably supported on the center of the upper portion of the rotary board 53. Below the lift board 54, there is disposed a lower actuator 55 such as an air cylinder, serving as a vertically shifting unit. And, the lift board 54 can be freely lifted and lowered by the lower actuator 55. Also, above the lift board 54, there is disposed a center pin 56 in a state that the center axis thereof is coincident with that of the lift board 54, while the center pin 56 also form the first support member. The center pin 56 can also be lifted and lowered by an upper actuator 57 such as an air cylinder, serving as a vertically shifting unit.

Also, on the upper surface of the lift board 54, there is formed a support recessed portion 58, which, in such a state that an input shaft 15 serving as rotary shaft is disposed in the vertical direction, is capable of supporting one end portion (the end portion on which a pressing device 9 is disposed; in FIGS. 1 to 6, and 8, the lower end portion) of the input shaft 15 with no play. That is, the support recessed portion 58 has a shape (for example, a polygonal shape such as a hexagonal shape) and a size which allow the support recessed portion 58 to be engaged with one end portion of the input shaft 15 with no play in such a manner that the input shaft 15 is prevented against rotation. And, in order that, in a state where one end portion of the input shaft 15 is engaged with the support recessed portion 58, the circumferential-direction phases of a plurality (in the case of the present embodiment, six) of outside diameter side ball spline grooves 46, 46 respectively formed in the outer peripheral surface of the middle portion of the input shaft 15 can be made to coincide with the phases of a phase matching pin 63, the leading end portions of ball supply pipes 66, 66 and probes 83, 83, the mounting positions of these component members 63, 66, 83 are restricted with respect to the circumferential-direction forming positions of the outside diameter side ball spline grooves 46, 46. Also, the leading end portion of the center pin 56 can be engaged without play with a receiving hole (not shown) formed in the other end face (in FIGS. 1 to 6 and 8, the upper end face) of the input shaft 15 disposed in the vertical direction as mentioned above.

Also, in an operation (to be discussed later) to assemble the balls 48, 48, a plurality (in the case of the present embodiment, six) of cylindrical-shaped spaces 90, 90 are respectively defined by and between the plurality of outside diameter side ball spline grooves 46, 46 and a plurality (in the case of the present embodiment, six) of inside diameter side ball spline grooves 47, 47 respectively formed in the inner peripheral surface of an input side disk 2B serving as a power transmission disk; and, in the portion of any one of the cylindrical-shaped spaces 90 that is opposed to the upper end opening thereof, there is disposed a phase matching device (phase matching means) 59. This phase matching device 59, as shown in detail in FIG. 3, includes an actuator 61 such as an air cylinder fixed to a support plate 60 disposed in the middle portion of the support frame 52, and a phase matching pin 63 fixed to the leading end portion of an output rod 62 forming the actuator 61. The leading end portion of the phase matching pin 63 can be inserted into the upper end opening of the above-mentioned one cylindrical-shaped space 90 with no play as the output rod 62 is drawn out of and taken into its associated cylinder portion. And, in a state where the leading end portion of the phase matching pin 63 is inserted with no play into the upper end opening of the above-mentioned one cylindrical-shaped space 90, the phases of the outside diameter side and inner diameter side ball spline grooves 46, 47 in the circumferential direction thereof are perfectly matched to each other and, further, this phase matched state is maintained.

Figure 4:
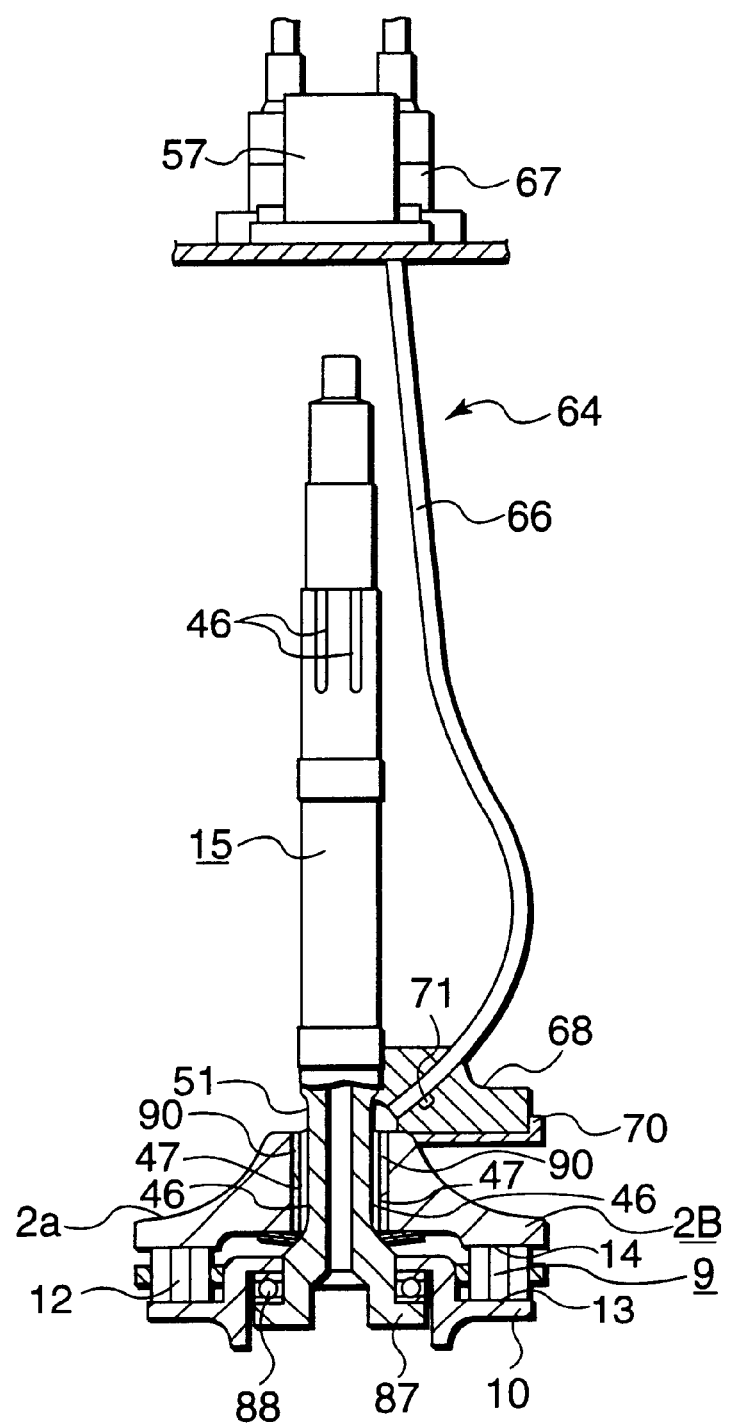
FIG. 4 is a partially cutaway enlarged front view of the input shaft, input side disk and ball supply device of the present ball assembling apparatus.
Figure 5:
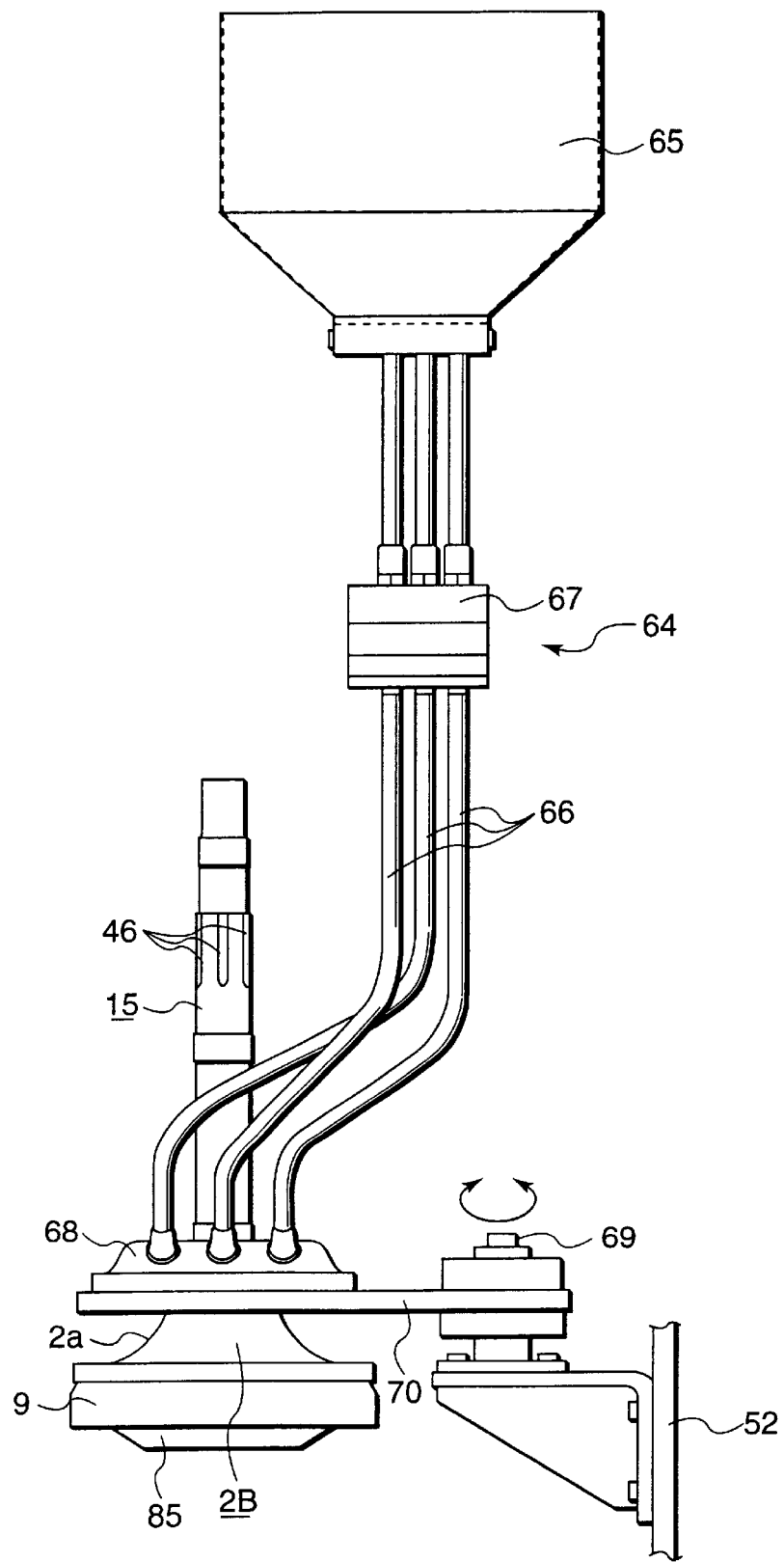
FIG. 5 is an enlarged view of a portion of the present ball assembling apparatus, when it is viewed from the right side of FIG. 4.

Also, on the upper end portion of the support frame 52, there is supported and fixed a ball storage container 65 which forms such a ball supply device (ball supply means) 64 as shown in detail in FIGS. 4 and 5. In the interior portion of the ball storage container 65, there are stored a large number of balls 48, 48 which are used to form the ball spline 40. By connecting the base end portions of a plurality (in the illustrated embodiment, three) of ball supply pipes 66, 66 to the lower end portion of the ball storage container 65, the balls 48, 48 stored within the ball storage container 65 can be fed into these respective ball supply pipes 66, 66. Also, in the middle portions of the respective ball supply pipes 66, 66, there are disposed a specific ball feed device 67, respectively. The specific ball feed device 67 is a device which stores therein once a specific number of balls 48, 48 fed from the base end side of the respective ball supply pipes 66, 66 and then feeds the specific number of balls 48, 48 sequentially therefrom to the leading end side of the respective ball supply pipes 66, 66. By the way, the number of balls 48, 48 fed out from the specific ball feed device 67 is restricted in accordance with a detect signal which is issued to a control unit (not shown) from a photoelectric sensor 71 (which will be discussed later).

Also, the leading end portions of the ball supply pipes 66, 66 are supported in the interior portion of a ball supply magazine 68. This ball supply magazine 68 is connected and fixed to the leading end portion of a swing arm 70 (FIG. 5) which is swingably supported on the middle portion of the support frame 52 by a vertical shaft 69. And, by swinging the swing arm 70 about the vertical shaft 69, the swing arm 70 can be moved toward and away from the portions of the upper end openings of the respective cylindrical-shaped spaces 90, 90 that are shifted from the phase matching pin 63 insertion portions with respect to the circumferential direction thereof.

And, the leading end openings of the ball supply pipes 66, 66 supported in the interior portion of the thus structured ball supply magazine 68 are respectively exposed to the front surface (the surface facing the upper end openings of the cylindrical-shaped spaces 90, 90 and, in particular, the left surface in FIGS. 1 and 4 and the back surface in FIG. 5) of the ball supply magazine 68. Also, as the swing arm 70 is swung, the leading end openings of the ball supply pipes 66, 66 can be made to approach and face the upper end openings of the cylindrical-shaped spaces 90, 90 {a plurality (in the present embodiment, three) of cylindrical-shaped spaces 90, 90 formed continuously with each other over the circumferential direction). And, in a state where the leading end openings of the ball supply pipes 66, 66 approach and face the upper end openings of the cylindrical-shaped spaces 90, 90, the balls 48, 48, which have been fed to the leading end portions of the ball supply pipes 66, 66, can be supplied into the cylindrical-shaped spaces 90, 90.

By the way, in the case of the present embodiment, the leading end side portions of the ball supply pipes 66, 66 that are situated forwardly of the specific ball feed device 67 are respectively formed of material having sufficient flexibility and light transmissibility, such as synthetic resin. And, a photoelectric sensor 71 is held in the interior portion of the ball supply magazine 68 that adjoins the leading end portions of the ball supply pipes 66, 66. This photoelectric sensor 71 is capable of measuring the number of balls 48, 48 that pass through the insides of the leading end portions of the ball supply pipes 66, 66. The number of balls 48, 48 measured by the photoelectric sensor 71 is transmitted as an electric signal to the above-mentioned control unit. The control unit transmits to the specific ball feed device 67 instruction signals telling that the balls 48, 48 are to be fed out to the leading end portions of the ball supply pipes 66, 66, until the number of balls 48, 48 measured by the photoelectric sensor 71 reaches a given number (the number to be supplied into the cylindrical-shaped spaces 90, 90; in the case of the present embodiment, three).

Also, in the portion of the middle portion of the support frame 52 that, in the balls 48 assembling operation to be discussed later, faces the outer peripheral surface of the input side disk 2B disposed on the outer peripheral surface of one end portion of the input shaft 15, there is disposed a swing device (a swing unit) 72 which can swing the input side disk 2B reciprocatingly in the circumferential direction thereof. This swing device 72, as shown in detail in FIGS. 6 and 7, consists of a combination of a first actuator 73 and a second actuator 75. Of the two actuators, the first actuator 73 is arranged in the horizontal direction and is supported on the middle portion of the support frame 52. Also, the second actuator 75 is similarly arranged in the horizontal direction and is connected and fixed to the leading end portion of a first rod 74 serving as the output shaft of the first actuator 73 in such a manner as to extend at right angles to the first rod 74. Due to this, the advancing and retreating direction of a second rod 76 forming the second actuator 75 can be made to coincide with the tangential direction of the outer peripheral surface of the input side disk 2B. Also, in the portion of the leading end portion of the second rod 76 that faces the outer peripheral surface of the input side disk 2B, there is fixed a pad 77 which can be frictionally engaged with the present outer peripheral surface.

Figure 6:
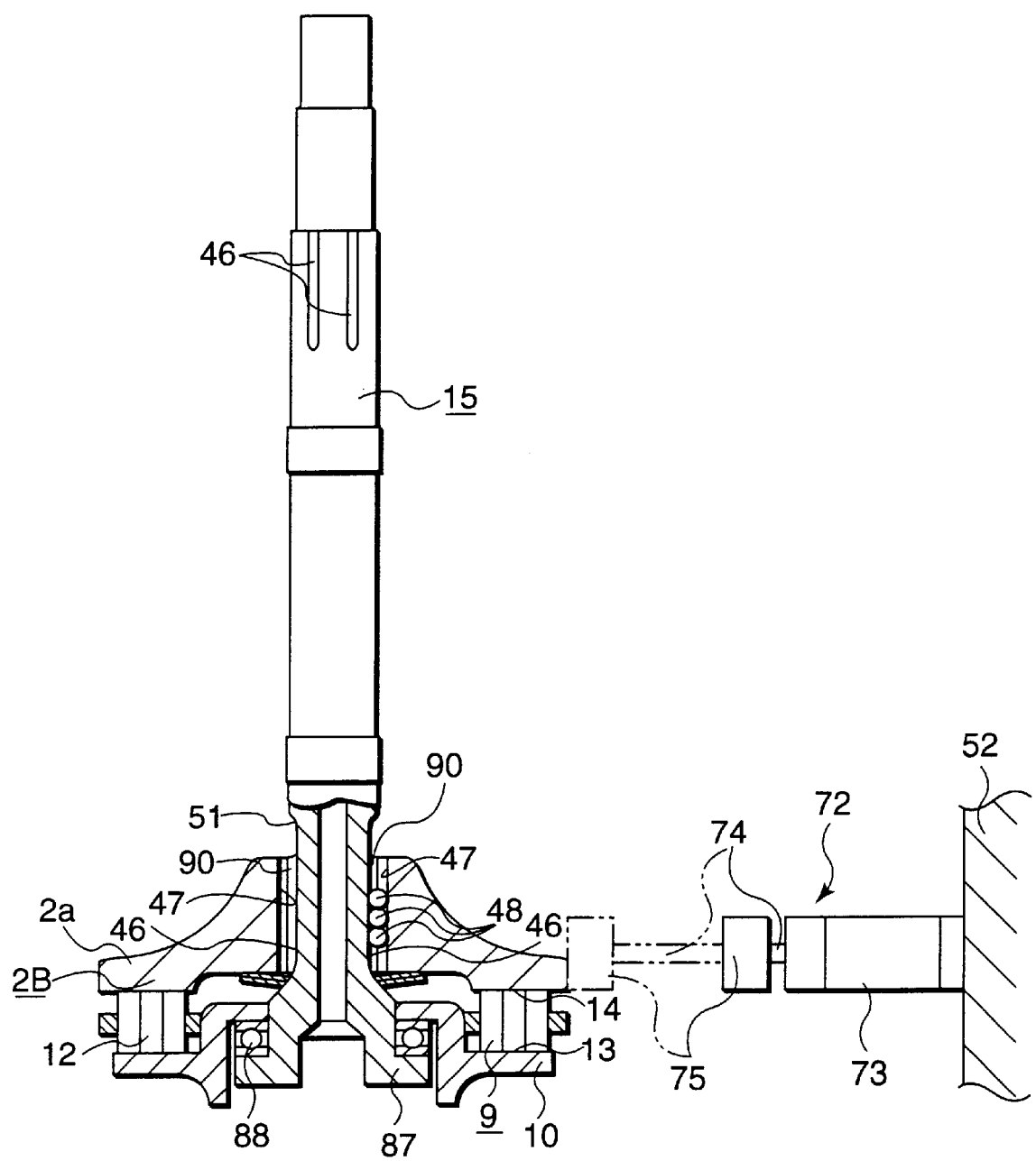
FIG. 6 is a partially cutaway enlarged front view of the input shaft, input side disk and swing device of the present ball assembling apparatus.
Figure 7:
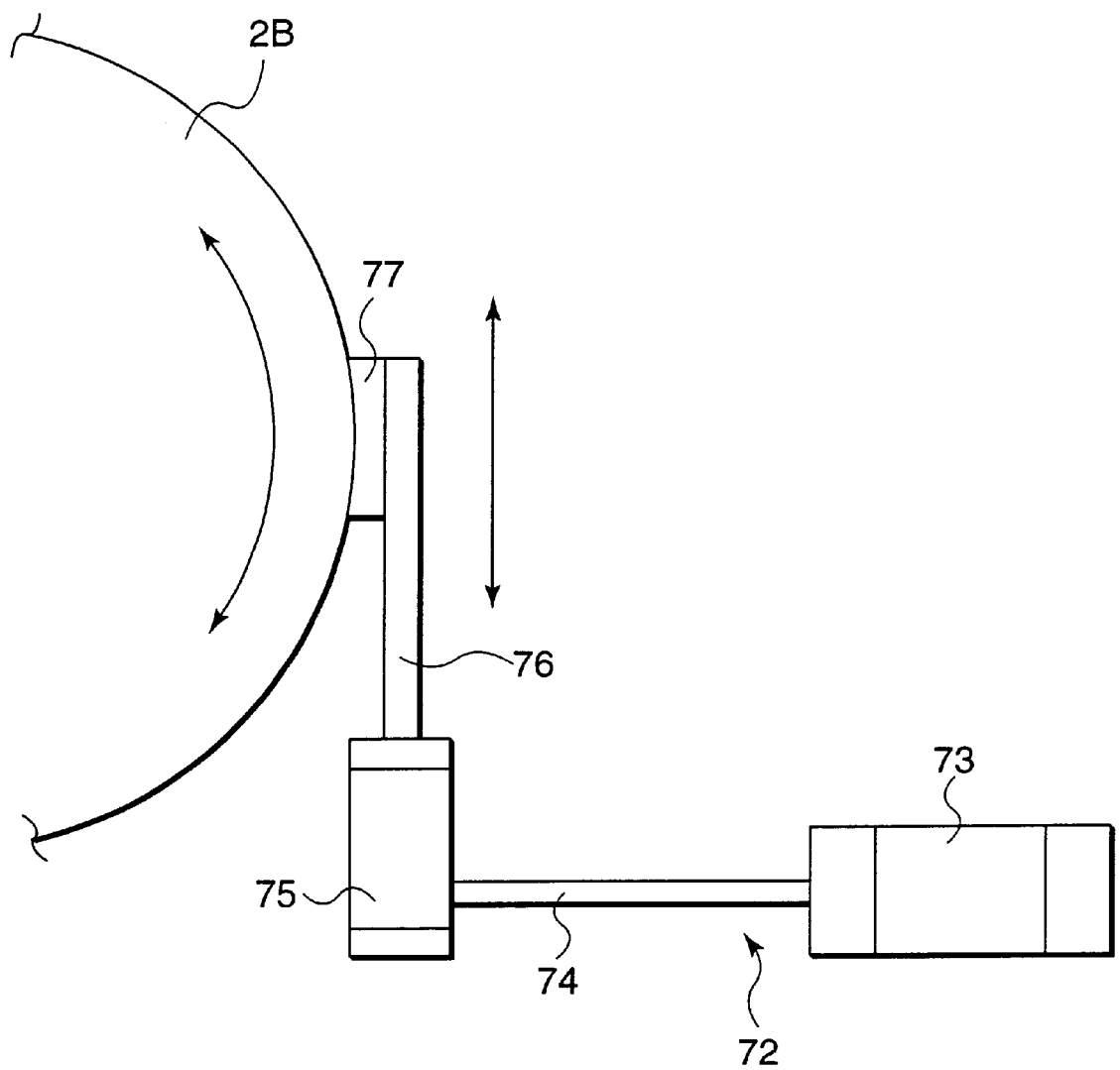
FIG. 7 is an enlarged view of a right half section of FIG. 6, when it is viewed from above.
Figure 8:
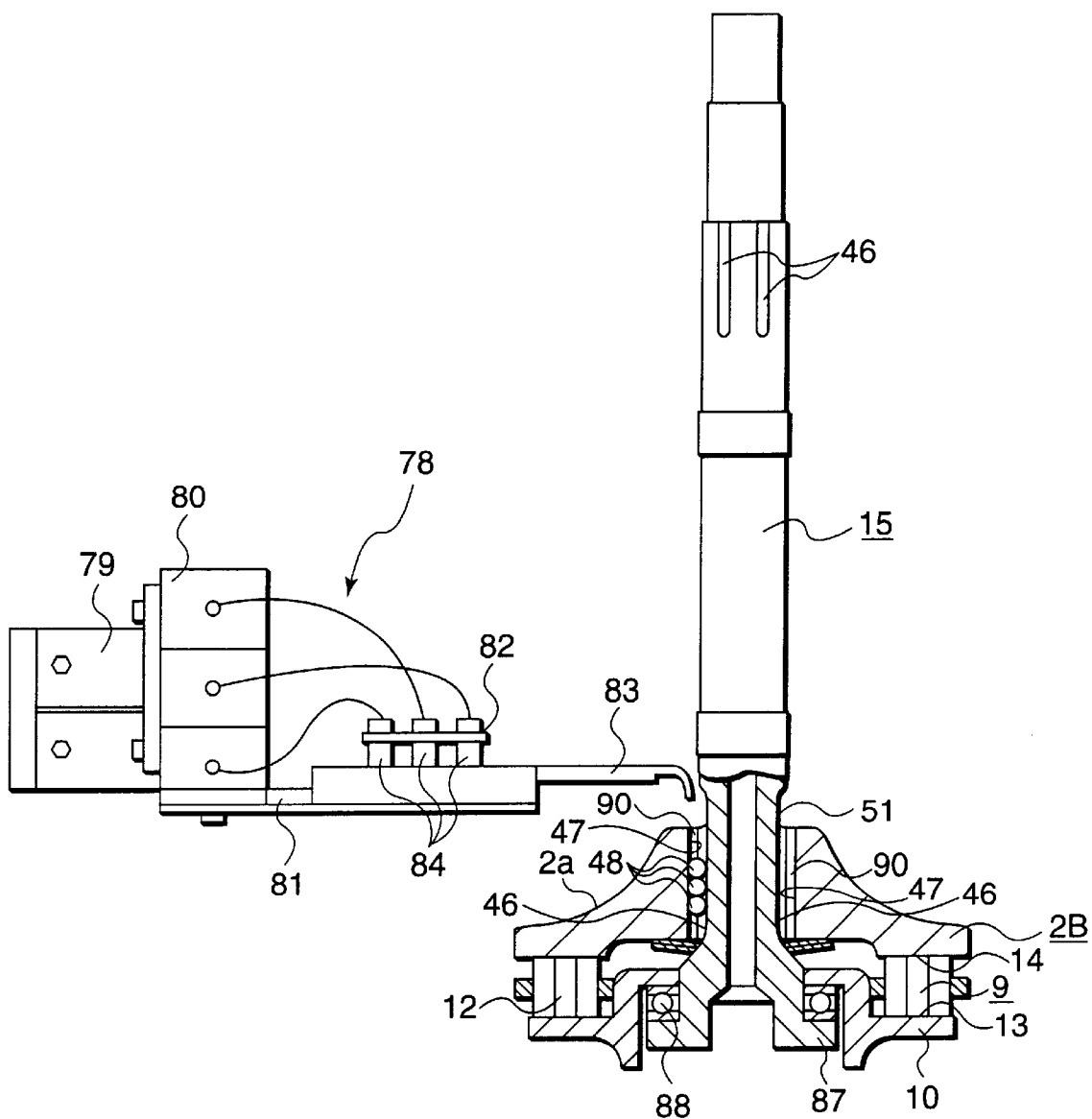
FIG. 8 is a partially cutaway enlarged front view of the input shaft, input side disk and ball number check device of the present ball assembling apparatus.
Figure 9A:
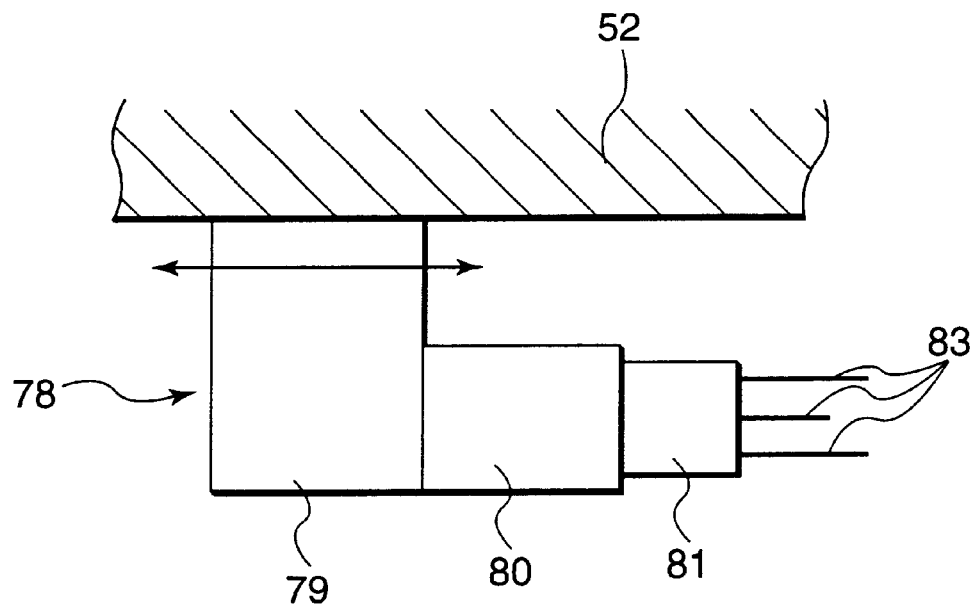
FIG. 9A is a view of the ball number check device, showing a state thereof when it is viewed from the above of FIG. 8.
Figure 9B:
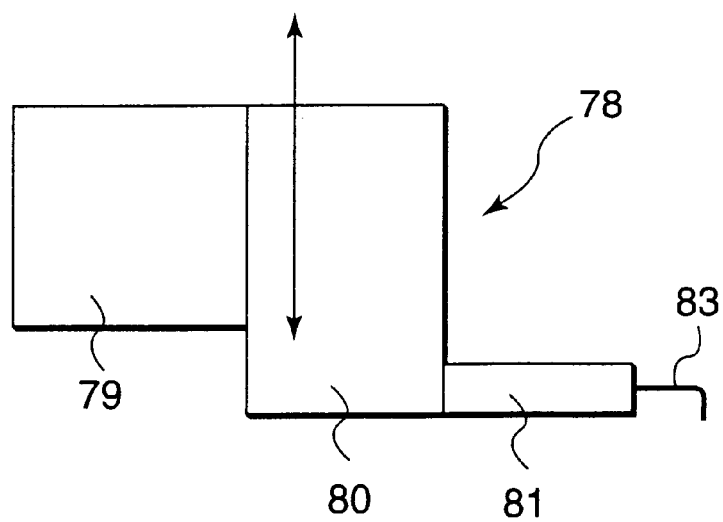
FIG. 9B is a view of the ball number check device, showing a state thereof when it is viewed from the same direction as FIG. 8.

To swing reciprocatingly the input side disk 2B along the circumferential direction thereof by the thus structured swing device 72, by advancing or pushing out the first rod 74 to the left in FIGS. 6 and 7, the pad 77 fixed to the leading end portion of the second rod 76 may be pressed against the outer peripheral surface of the input side disk 2B. And, in this state, by advancing and retreating the second rod 76 in the vertical direction of FIG. 7, the input side disk 2B may be reciprocatingly swung along the circumferential direction. On the other hand, when the input side disk 2B is not to be swung, by retreating or pulling in the first rod 74 to the right in FIGS. 6 and 7, the pad 77 may be retreated from the outer peripheral surface of the input side disk 2B.

Also, on the portion of the middle portion of the support frame 52 that is shifted from the ball supply magazine 68 with respect to the circumferential direction with the center axes of the lift board 54 and center pin 56 as a center thereof (in the case of the present embodiment, on the 180° opposite side portion to the ball supply magazine 68), there is disposed a ball number check device 78. This ball number check device 78 is a device which checks whether a given number of balls 48, 48 have been supplied into the respective cylindrical-shaped spaces 90, 90 by the ball supply device 64 or not. As shown in detail in FIGS. 8 and 9, the ball number check device 78 includes a horizontally moving part 79, a vertically moving part 80, a support part 81, and a check part 82.

Of the above parts, the horizontally moving part 79 is supported on the middle portion of the support frame 52 and can be moved reciprocatingly in the radial direction with the center axes of the lift board 54 and center pin 56 as a center thereof. Also, the vertically moving part 80 is supported on the front surface (in FIGS. 1, 8 and 9, the right surface) of the horizontally moving part 79 and can be moved reciprocatingly in a vertical direction to the horizontally moving part 79. Further, the support part 81 is supported on the lower end portion of the vertically moving part 80 in such a manner that it extends out forwardly (in FIGS. 1, 8 and 9, to the right) of the front surface of the vertically moving part 80. Moreover, the check part 82 is supported on the front end portion of the support part 81 and includes a plurality (in the case of the present embodiment, three) of probes 83, 83 respectively disposed so as to extend out forwardly, and a plurality of sensors 84, 84 respectively disposed on the base end portions of the respective probes 83, 83. Also, the leading end portions of the probes 83, 83 are respectively bent almost at right angles downwardly in the vertical direction, while the thus bent leading end portions of the probes 83, 83 can be respectively inserted into the cylindrical-shaped spaces 90, 90 {the plurality (in the case of the present embodiment, three) of cylindrical-shaped spaces 90, 90 disposed continuously along the circumstantial direction) from the upper end openings of these cylindrical-shaped spaces 90, 90.

In the ball 48 assembling operation to be discussed later, to check whether a given number of balls 48, 48 have been assembled into the respective cylindrical-shaped spaces 90, 90 or not by the number check device 78, at first, the horizontally moving part 79 may be moved forwardly to thereby position the leading end portions of the respective probes 83, 83 respectively above the upper end openings of the cylindrical-shaped spaces 90, 90. Next, by moving the vertically moving part 80 downwardly, the leading end portions of the probes 83, 83 may be respectively inserted into the cylindrical-shaped spaces 90, 90 through the upper end openings of these cylindrical-shaped spaces 90, 90. Then, the leading end portions of the probes 83, 83 may be contacted with the upper surfaces of the balls 48, 48 that is present at the top of the plurality of balls 48, 48 assembled into the cylindrical-shaped spaces 90, 90. In case where the leading end portions of the probes 83, 83 are contacted with the upper surface of the ball 48, the sensors 84, 84 detect such contact. And, in accordance with the thus detected position (height position), it is checked whether a given number of balls 48, 48 have been assembled into the respective cylindrical-shaped spaces 90, 90 or not. By the way, in case where the number of balls 48, 48 assembled into the respective cylindrical-shaped spaces 90, 90 is larger than the given number, the vertically moving part 80 may be returned upwardly just after the leading end portions of the probes 83, 83 are contacted with the upper surface of the ball 48, which makes it possible to prevent the probes 83, 83 against damage.

Now, the operation to assemble the balls 48, 48 by the given number between the outside diameter side and inside diameter side ball spline grooves 46, 47 using the above-structured ball assembling apparatus according to the invention is executed in the following manner. That is, at first, the input shaft 15 and input side disk 2B, which respectively include the outside diameter side and inside diameter side ball spline grooves 46, 47 are set in the ball assembling apparatus according to the invention. In this setting operation, the input side disk 2B is firstly disposed on the periphery of one end portion of the input shaft 15 together with the respective component members of the pressing device 9. In this case, the securing rings 50*a* (FIG. 11) are respectively mounted in their associated securing grooves 49*a* formed in the near-to-one-end portions of the outside diameter side ball spline grooves 46, 46, whereas the securing rings 50 (FIGS. 10 and 11) are not yet mounted in their associated securing grooves 49 formed in the near-to-the-other-end portions of the inside diameter side ball spline grooves 47, 47.

And, in a state where the input shaft 15 stands up in the vertical direction, one end portion of the input shaft 15 is fitted into and supported by the support recessed portion 58 formed in the upper surface of the lift board 54 and, at the same time, the input side disk 2B and the component members of the pressing device 9 are respectively supported on the upper surface of the rotary board 53.

In this operation, the lift board 54 is lifted up to a position as high as it can be lifted. In this state, similarly to the time of completion of a toroidal-type continuously variable transmission, a thrust ball bearing 88, which is interposed between an outwardly facing flange-like collar portion 87 formed on one end portion of the input shaft 15 and has an outer periphery of a non-circular shape such as a hexagonal shape and the inside diameter side portion of the cam plate 10 forming the pressing device 9, is held by and between the collar portion 87 and cam plate 10. And, the outside diameter side and inside diameter side ball spline grooves 46, 47 are matched to each other with respect to the axial direction thereof. Also, as has been described previously, in accordance with the mutual engagement between one end portion of the input shaft 15 and the support recessed portion 58, the phases of the outside diameter side ball spline grooves 46, 46 in the circumferential direction thereof are matched to the phases of the phase adjusting pin 63, the leading end portions of the ball supply pipes 66, 66, and the probes 83, 83.

After one end portion of the input shaft 15 is supported on the lift board 54 as well as the input side disk 2B and the component members of the pressing device 9 are supported on the upper surface of the rotary board 53 respectively in the above-mentioned manner, by adjusting (rotating) the input side disk 2B by hand, the circumferential-direction phases of the outside diameter side and inside diameter side ball spline grooves 46, 47 are substantially matched to each other. Next, a start switch of the ball assembling apparatus according to the invention is turned on. In response to this, the center pin 56 is moved downwardly so that the leading end portion of the center pin 56 is engaged with the receiving hole formed in the other end face of the input shaft 15. This completes the setting of the input shaft 15 and input side disk 2B.

After completion of the setting of the input shaft 15 and input side disk 2B, the leading end portion of the phase matching pin 63 forming the phase matching device 59 is inserted with no play into one of the cylindrical-shaped spaces 90, 90 defined by and between the outside diameter side and inside diameter side ball spline grooves 46, 47, that is, the cylindrical-shaped space 90 that faces the phase matching pin 63. As a result of this, the phases of the outside diameter side and inside diameter side ball spline grooves 46, 47 in the circumferential direction thereof are matched to each other perfectly, and this phase matched state is maintained. Next, the ball supply magazine 68 is shifted toward the upper end openings of the cylindrical-shaped spaces 90, 90, and the leading end openings of the ball supply pipes 66, 66 approach and face the upper end openings of the cylindrical-shaped spaces 90, 90 (in the case of the present embodiment, of a total of six cylindrical-shaped spaces 90, 90, the three cylindrical-shaped spaces 90, 90 located on one side of the circumferential direction other than the cylindrical-shaped space 90 with the phase matching pin 63 inserted therein and the cylindrical-shaped spaces 90, 90 located so as to adjoin the cylindrical-shaped space 90 with the phase matching pin 63 inserted therein). And, the balls 48, 48 are supplied by the given number into the respective cylindrical-shaped spaces 90, 90 through their associated upper end openings.

Next, the phase matching pin 63 retreats from the insides of the cylindrical-shaped spaces 90, 90, and the lift board 54 and center pin 56 shift the input shaft 15 reciprocatingly (with respect to the input side disk 2B) in the axial direction thereof (in the vertical direction). After then, the pad 77 forming the swing device 72 is pressed against the outer peripheral surface of the input side disk 2B. And, the swing device 72 swings the input side disk 2B reciprocatingly in the circumferential direction thereof (with respect to the input shaft 15). As a result of this, there occurs a moment when slight clearances exist between the surfaces of the balls 48, 48 and the inner surfaces of the two spline grooves 46, 47. In other words, such frictional force as can prevent the downward movements of the balls 48, 48 is removed from between the surfaces of the balls 48, 48 and the inner surfaces of the two ball spline grooves 46, 47. Therefore, due to the gravity acting on the balls 48, 48, these balls 48, 48 are fed (dropped) into the lower portions of the cylindrical-shaped spaces 90, 90. That is, in the case of the present invention, even in case where the surfaces of the balls 48, 48 are frictionally engaged with the inner surfaces of the two ball spline grooves 46, 47 and the balls 48, 48 clogs around the neighborhood of the upper end portions of the cylindrical-shaped spaces 90, 90, these balls 48, 48 can be fed into the lower portions of the cylindrical-shaped spaces 90, 90. By the way, at the time of end of the above-mentioned reciprocating shift of the input shaft 15 in the axial direction, the lift board 54 is returned back to the above-mentioned highest position again.

Next, after the ball supply magazine 68 retreats from the upper end openings of the cylindrical-shaped spaces 90, 90, the rotary board 53 is rotated by a given angle (in the case of the present embodiment, an angle of 180°) by an indexing device 91 so that the upper end openings of the cylindrical-shaped spaces 90, 90 with the balls 48, 48 supplied thereto are set at positions where they can be matched to the leading end portions of the probes 83, 83 forming the ball number check device 78. After then, in accordance with the fact that the leading end portions of the probes 83, 83 are inserted into the cylindrical-shaped spaces 90, 90 with the balls 48, 48 supplied thereto, it is checked whether a given number of balls 48, 48 have been supplied into these cylindrical-shaped spaces 90, 90 or not. And, after completion of this checking operation, the leading end portions of the probes 83, 83 are caused to retreat from the insides of the cylindrical-shaped spaces 90, 90. By the way, in the case of the present embodiment, by setting the number of the probes 83, 83 at three, the above check can be executed simultaneously on three cylindrical-shaped spaces 90, 90. However, by reducing the number of the probes 83, 83 (for example, down to one), the above check can also be executed sequentially on the cylindrical-shaped spaces 90, 90.

In case where the check as to the number of balls 48, 48 present within a part (in the case of the present embodiment, three of circumferential-direction one side) of the cylindrical-shaped spaces 90, 90 is completed, for the remaining cylindrical-shaped spaces 90, 90 (three of circumferential-direction the other side) as well, the balls 48, 48 are assembled or supplied according to the above-mentioned procedure and the number of the supplied balls 48, 48 is checked similarly.

Figure 11:
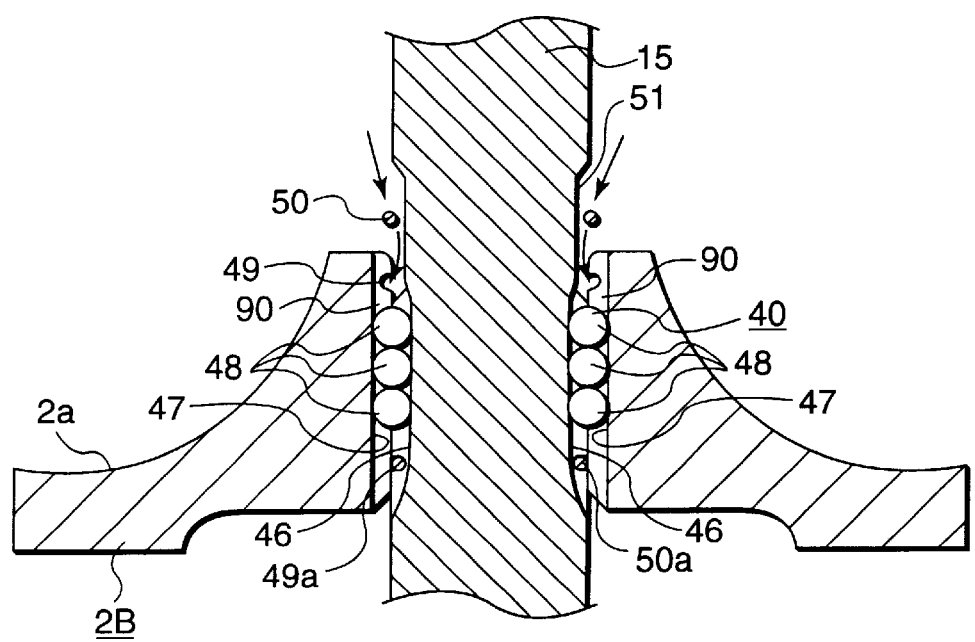
FIG. 11 is a section view taken along the line XI—XI shown in FIG. 10.
Figure 12:
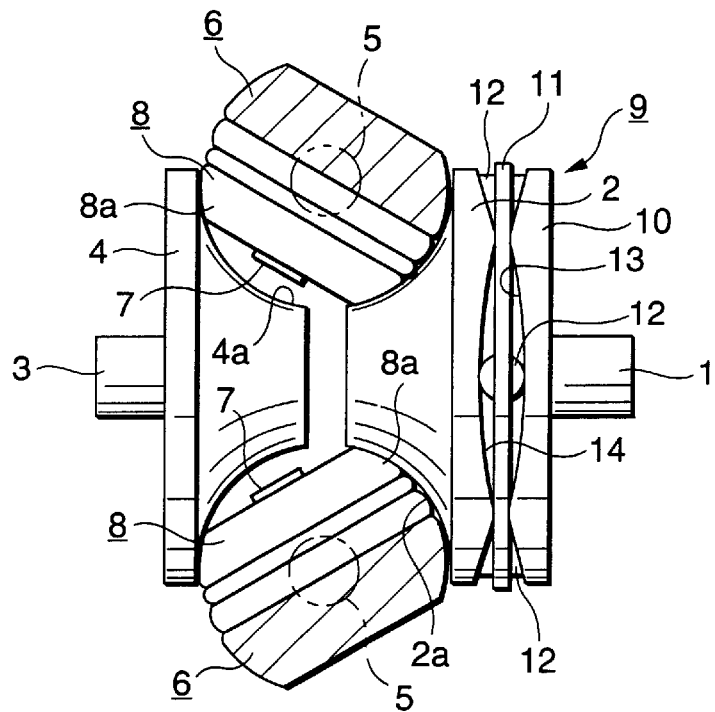
FIG. 12 is a side view of the basic structure of a conventional toroidal-type continuously variable transmission, showing its largest speed decreasing state.
Figure 13:
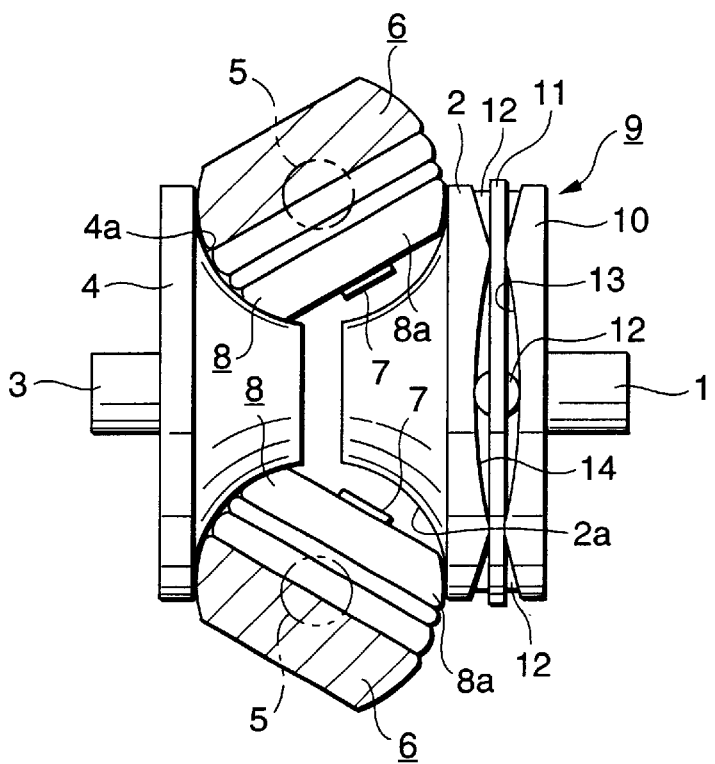
FIG. 13 is a side view of the basic structure of the above conventional toroidal-type continuously variable transmission, showing its largest speed increasing state.
Figure 14:
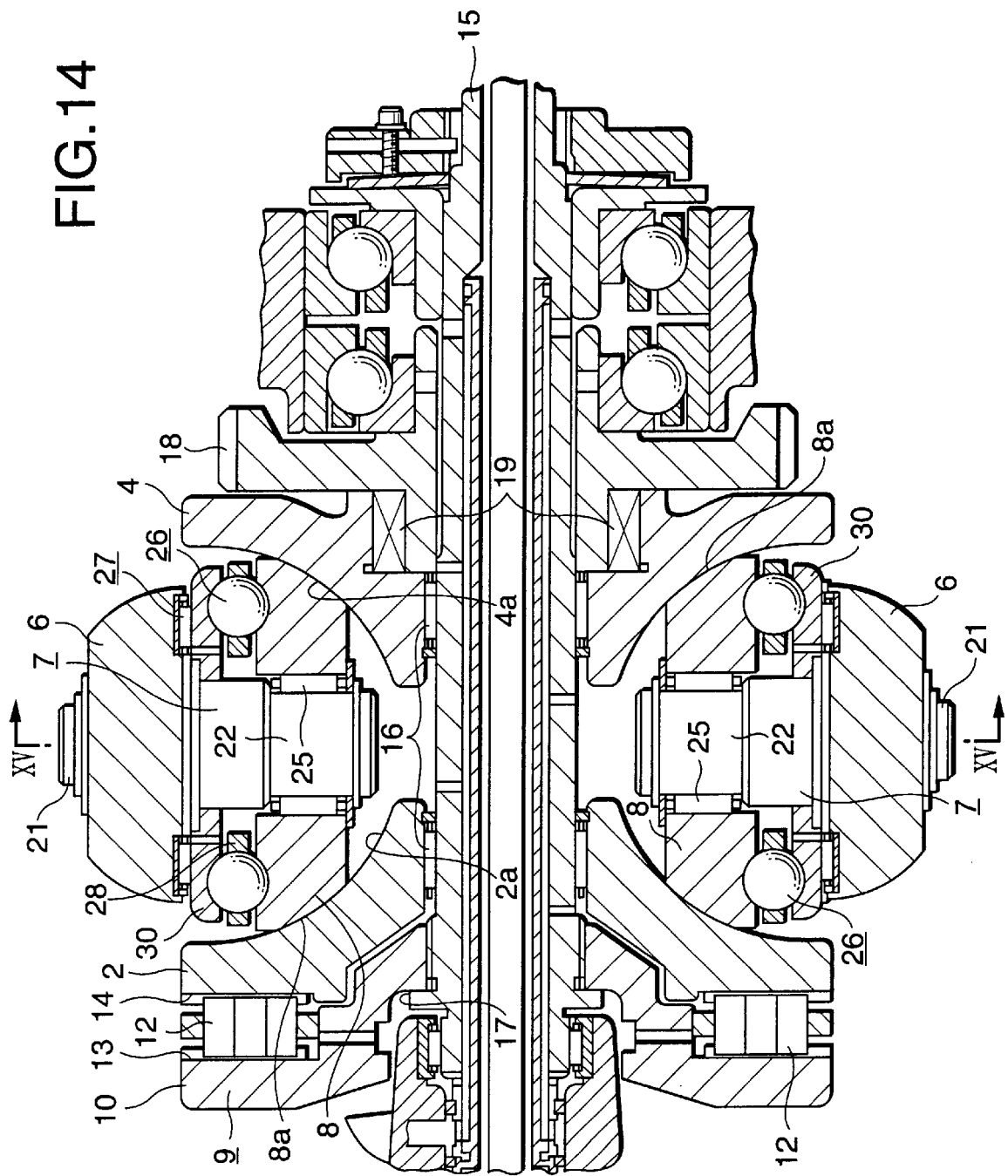
FIG. 14 is a section view of a first example of a conventional structure.
Figure 15:
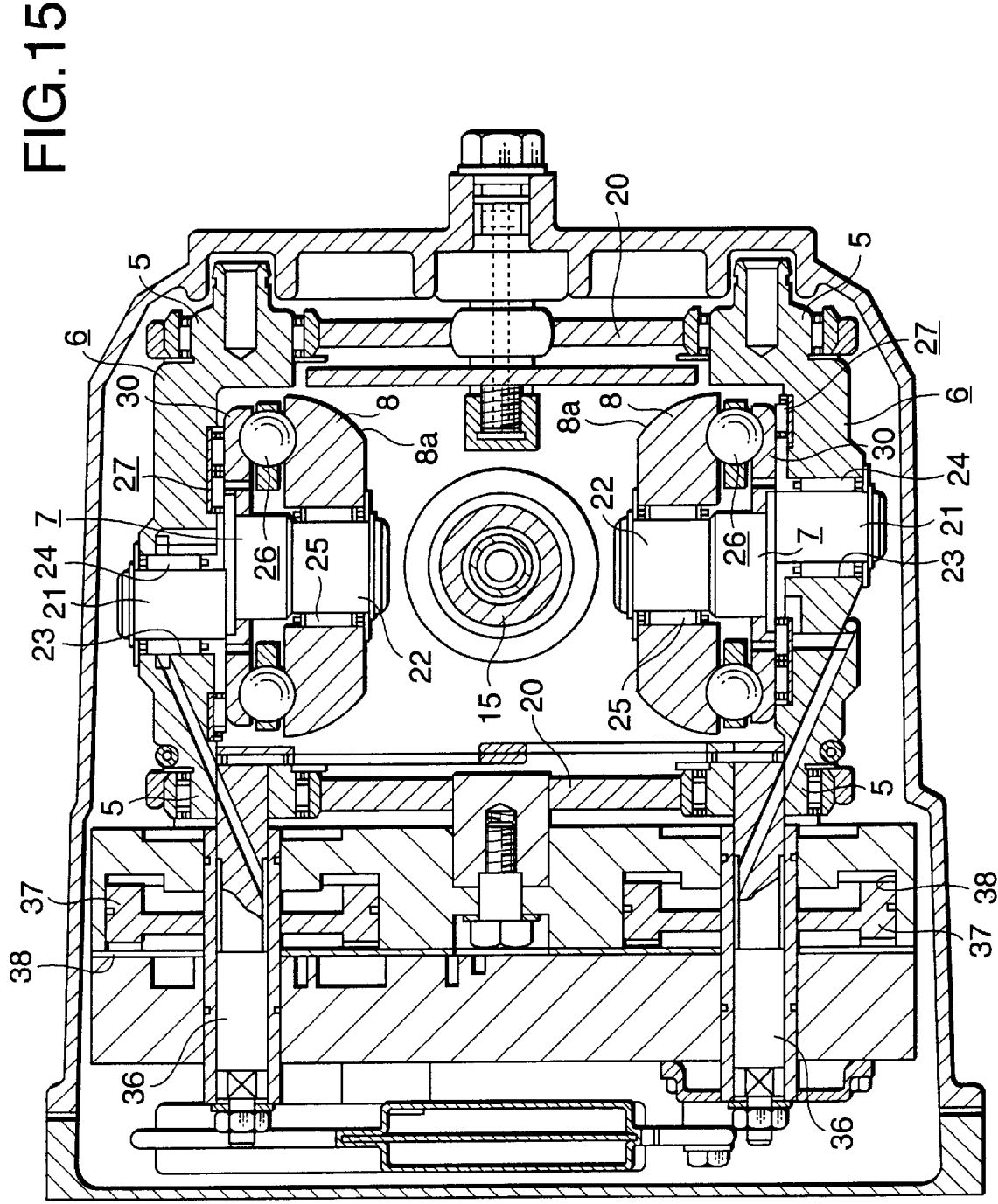
FIG. 15 is a section view taken along the line XV—XV shown in FIG. 14.
Figure 16:
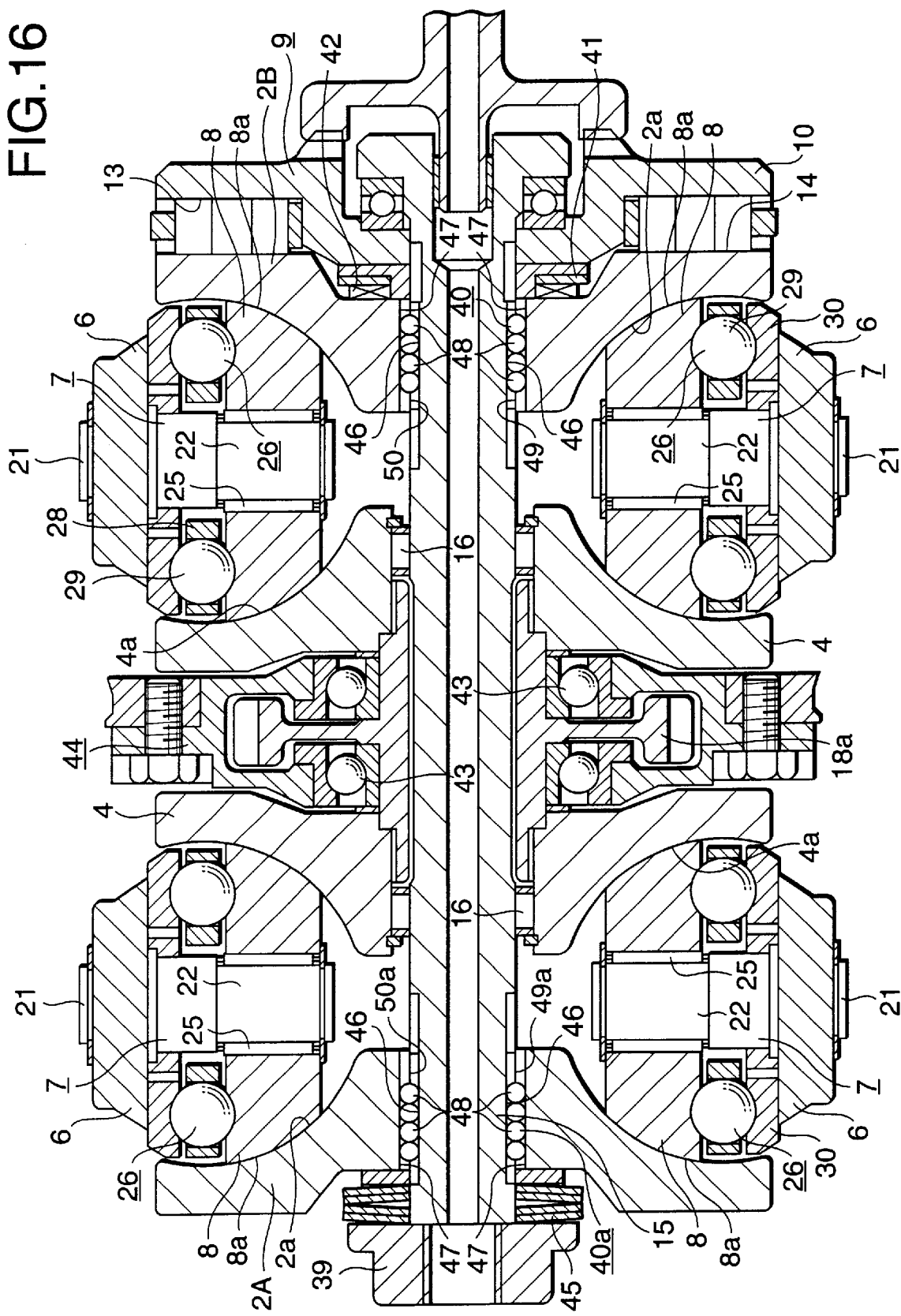
FIG. 16 is a partially sectional view of a second example of a conventional structure.
Figure 17:
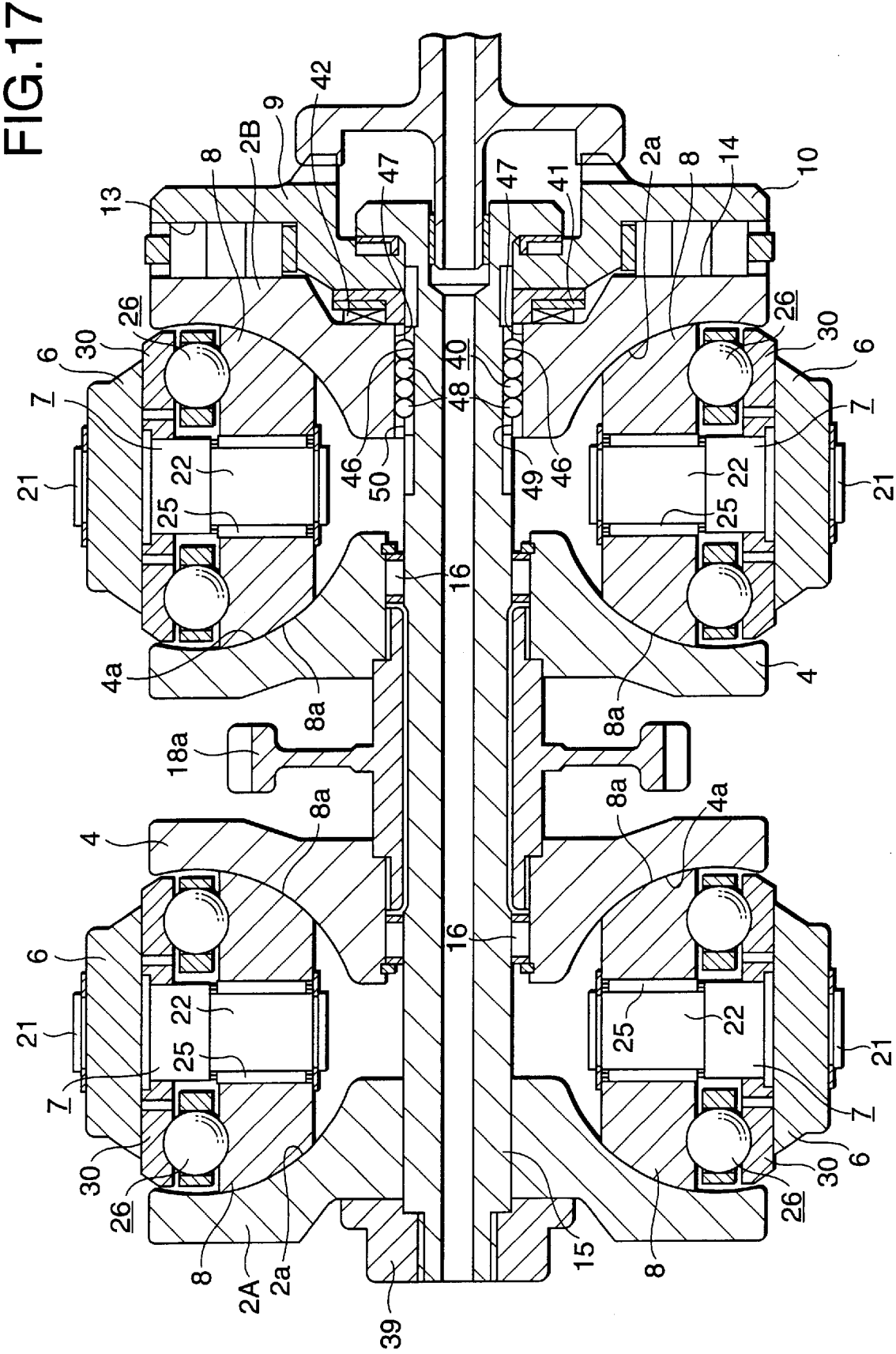
FIG. 17 is a partially sectional view of a third example of a conventional structure.
Figure 18:
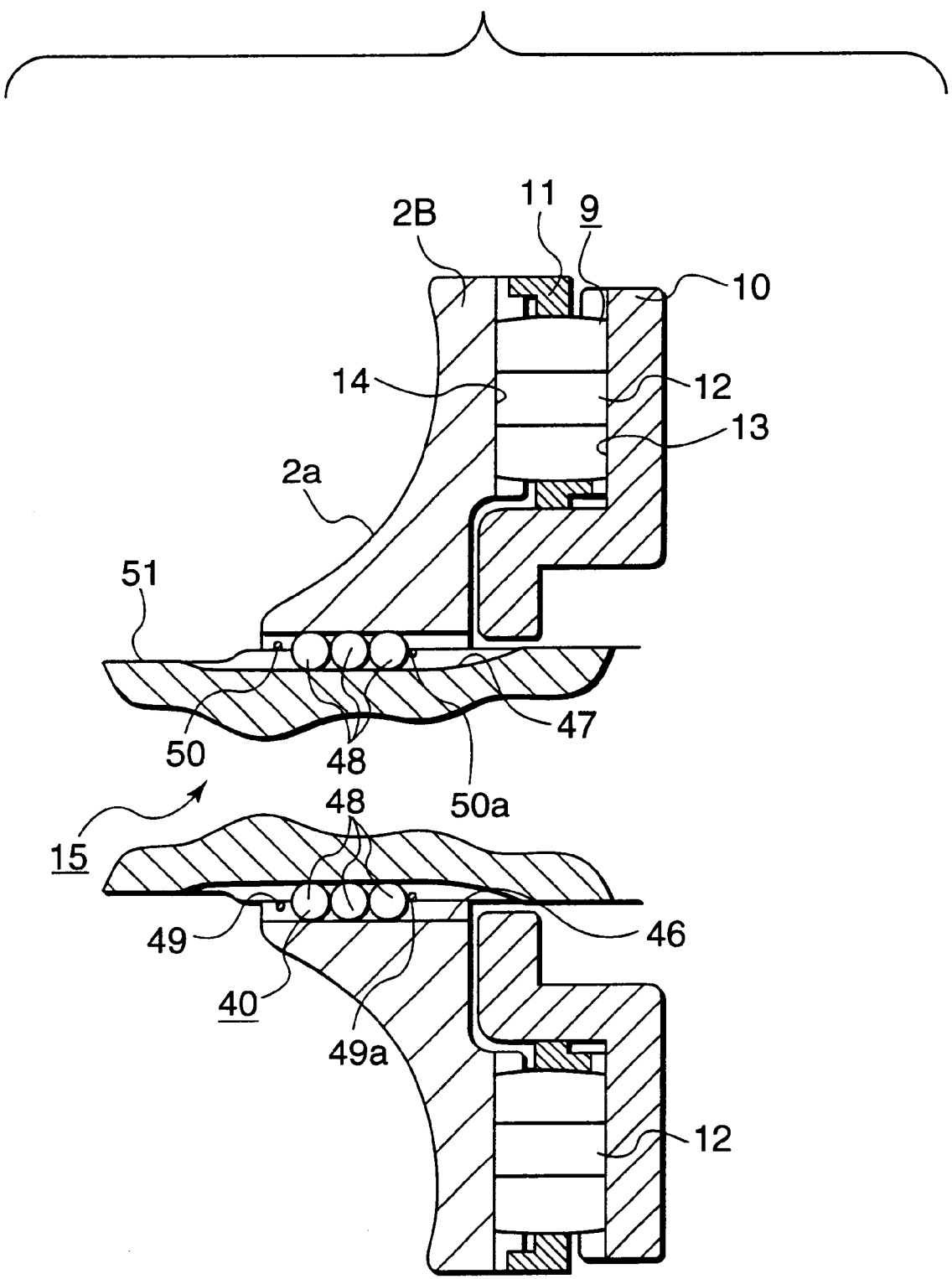
FIG. 18 is a section view of the main portion of a fourth example of a conventional structure, showing a state thereof in which an input shaft and an input side disk have been combined together through a ball spline.
Figure 19:
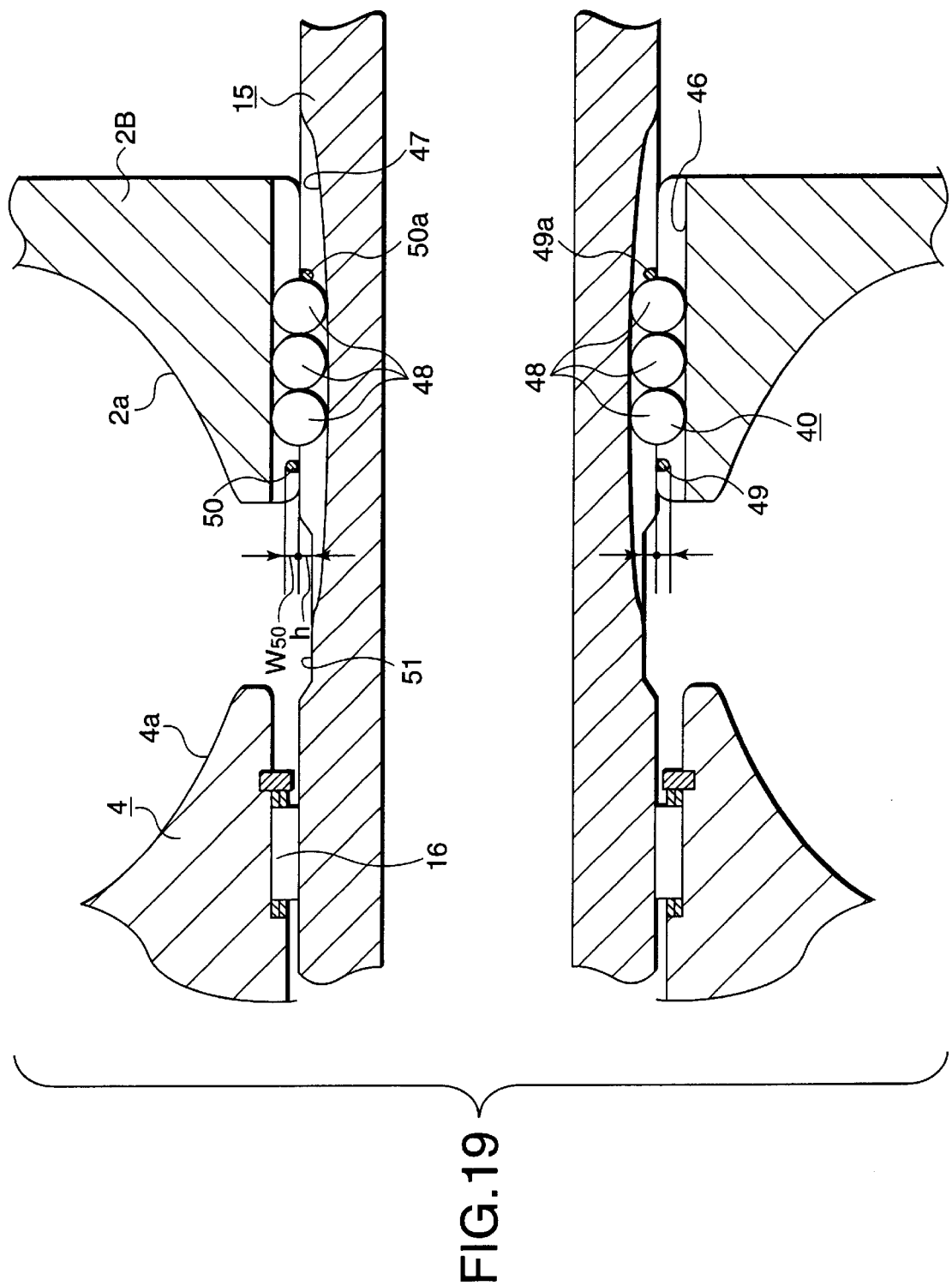
FIG. 19 is an enlarged section view of the central portion of FIG. 18.
Figure 20:
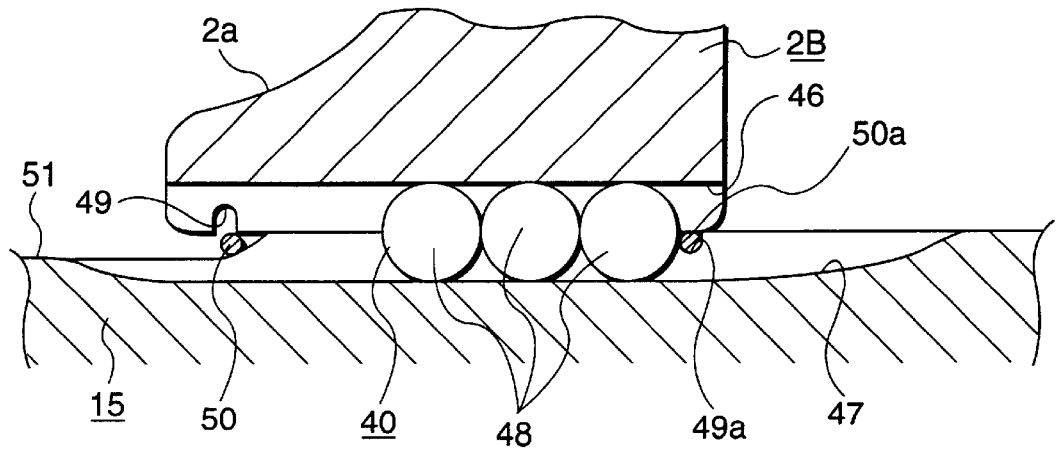
FIG. 20 is a section view of the main portion of the fourth example of a conventional structure, showing a state thereof in which the input shaft and input side disk are being combined together through the ball spline.
Figure 21:
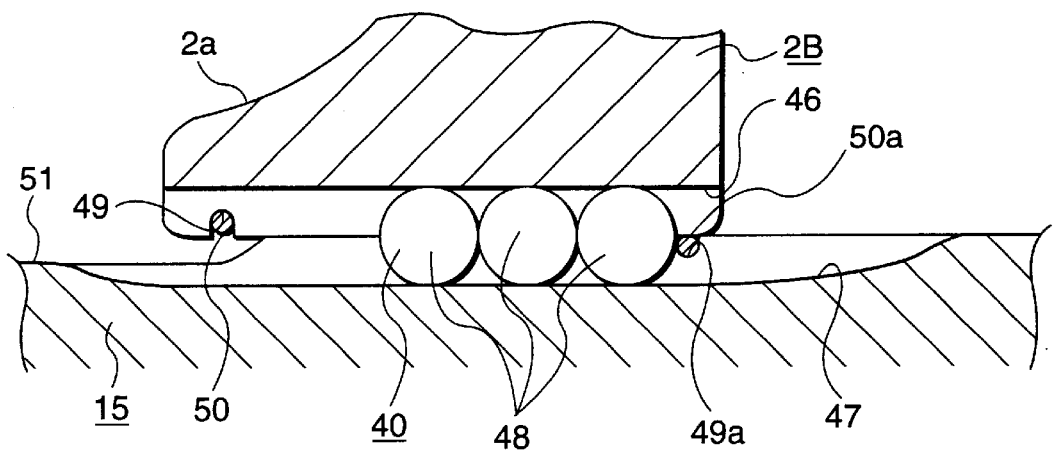
FIG. 21 is a section view of the main portion of the fourth example of a conventional structure, showing a state thereof continuing with the state shown in FIG. 20; and, FIG. 22 is a section view of the main portion of the fourth example of a conventional structure, showing a state thereof continuing with the state shown in FIG. 21.
Figure 22:
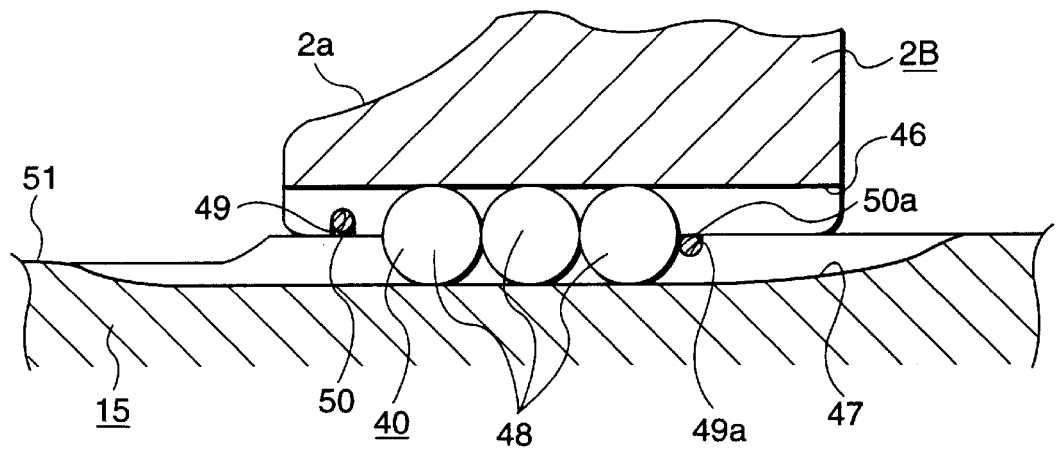

In case where the ball number check device 78 confirms that the given number of balls 48, 48 have been assembled into all of the cylindrical-shaped spaces 90, 90, the lift board 54 and center pin 56 are next moved downward slightly. And, as shown in FIG. 11, the inside diameter side openings of securing grooves 49 respectively formed in the near-to-the-other-end portions (in FIG. 11, the near-to-upper-end portions) of the inside diameter side ball spline grooves 47, 47 are respectively made to open to the small-diameter portions 51 respectively formed on the portions of the outer peripheral surface of the middle portion of the input shaft 15 that adjoin the other end edges of the outside diameter side ball spline grooves 46, 46. In this state, the ball assembling apparatus according to the invention is held in a wait state.

Figure 10:
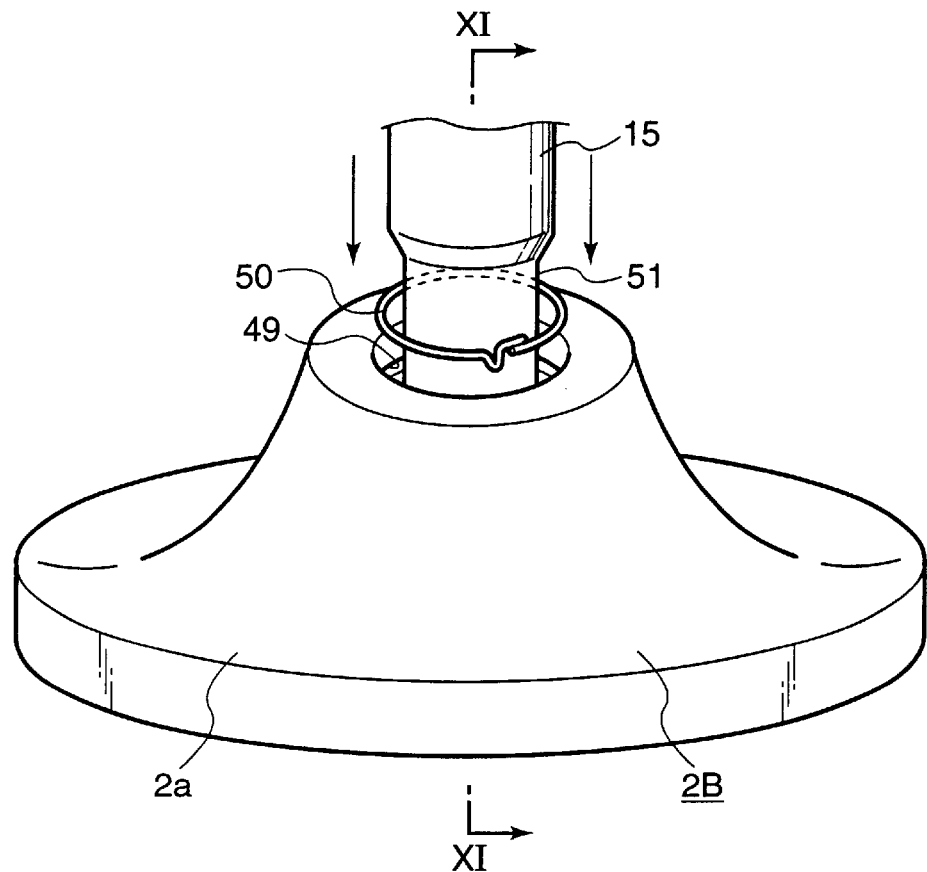
FIG. 10 is a perspective view of a securing ring, input shaft and input side disk, showing a state thereof in which the securing ring is inserted into between the outer peripheral surface of the input shaft and the inner peripheral surface of the input side disk.

In case where the ball assembling apparatus is held in a wait state in this manner, next, as shown in FIGS. 10 and 11, similarly to the structure (see FIGS. 20 to 22) disclosed in the above-cited publication JP-A-11-51135, the securing rings 50 are respectively assembled by hand to the securing grooves 49 formed in the inner peripheral surface of the input disk 2B. That is, the securing rings 50, each of which is formed of elastic material such as stainless spring steel or oilresisting and heat-resisting synthetic resin in a partially cutaway circular shape, are fitted around the periphery of the input shaft 15 through the smallest outside diameter portions of the center pin 56. And, as shown by arrow lines in FIGS. 10 and 11, the securing rings 50 are engaged into their associated securing grooves 49 through the small-diameter portion 51 formed in a part of the input shaft 15. By the way, in the case of the present embodiment as well, the securing ring 50 is provided with elasticity in a direction to spread its diameter in its free state. Thanks to this, in the above-mentioned case, the securing ring 50 can be engaged into the securing groove 49 due to the elasticity of the securing ring 50 itself.

Next, in this state, in case where the start switch of the ball assembling apparatus according to the invention is turned on again, the input shaft 15 is moved up and down by the lift board 54 and center pin 56 slightly (to such a degree that the balls 48, 48 lifted upwardly by the securing ring 50a secured to the securing groove 49a can be prevented from contacting the securing ring 50). In this state, in case where the securing ring 50 is perfectly mounted into the securing groove 49, the inside diameter of the securing ring 50 becomes larger than the outside diameter of the portion of the input shaft 15 that is shifted from the small-diameter portion 51. For this reason, although the input shaft 15 is moved upward, the input side disk 2B is prevented from moving upward. On the other hand, in case where the securing ring 50 is not perfectly mounted into the securing groove 49, the inside diameter of the securing ring 50 becomes smaller than the outside diameter of the portion of the input shaft 15 that is shifted from the small-diameter portion 51. Therefore, the input side disk 2B rises together with the input shaft 15. Thus, when the input shaft 15 rises, the movement of the input side disk 2B is detected by a sensor 89 supported on the middle portion of the support frame 52 to thereby confirm whether the securing ring 50 is positively mounted in the securing groove 49 or not. And, after confirmation of the mounting of the securing ring 50, an assembling unit, which is composed of the input shaft 15, input side disk 2B and other component members, is manually taken out from the ball assembling apparatus according to the invention, which completes the assembling operation of the balls 48, 48.

As described above, according to the ball assembling apparatus of the invention, the balls 48, 48 can be positively assembled by given numbers into the plurality of cylindrical-shaped spaces 90, 90 respectively defined by and between the outside diameter side and inside diameter side ball spline grooves 46, 47. Also, such assembling operation of the balls 48, 48 can be executed automatically, which can eliminate a troublesome operation supplying a plurality of balls 48, 48 from the upper end openings of the respective cylindrical-shaped spaces 90, 90. Further, when compared with the previously described conventional structures, the mechanism of the present invention can be simplified and thus can be made compact. This makes it easy to arrange the ball assembling apparatus according to the invention in the manufacturing line of a toroidal-type continuously variable transmission.

By the way, in the above-mentioned embodiment, a description has been given of a case in which, of a toroidal-type continuously variable transmission of a double cavity type, the ball spline 40 on the pressing device 9 side is assembled. However, the present invention can also be applied to a case in which the ball spline 40a on the opposite side to the pressing device 9 is assembled, and further the present invention can be applied to a toroidal-type continuously variable transmission having another structure.

Since the method and apparatus for assembling the balls that form the ball spline of a toroidal-type continuously variable transmission are structured and operate in the above-mentioned manner, use of the present ball assembling method and apparatus can facilitate an operation to combine a rotary shaft such as an input shaft with a power transmission disk such as an input side disk through a ball spline. This can enhance the efficiency of the assembling operation of a toroidal-type continuously variable transmission incorporating a ball spline therein and thus can contribute to reducing the manufacturing cost of such toroidal-type continuously variable transmission.

What is claimed is:

1. A method for assembling balls forming a ball spline of a toroidal-type continuously variable transmission, said transmission comprising:

a rotary shaft having a plurality of outside diameter side ball spline grooves respectively formed at a plurality of circumferential-direction portions of the outer peripheral surface of the middle portion thereof, each of which extends in an axial direction thereof;

a power transmission disk supported on the periphery of the middle portion of said rotary shaft in such a manner as to be shiftable with respect to said rotary shaft only in the axial direction thereof through the ball spline, said power transmission disk having a plurality of inside diameter side ball spline grooves respectively formed at a plurality of circumferential-direction portions of the inner peripheral surface thereof such as to face said respective outside diameter side ball spline grooves, each of which extends in the axial direction thereof; and said balls disposed in a plurality of cylindrical-shaped spaces respectively defined by and between said outside diameter side and inside diameter side ball spline grooves, said method comprising the steps of:
  assembling a member for preventing said balls from slipping out from openings formed in the respective lower end portions of said plurality of cylindrical-shaped spaces;
  disposing said power transmission disk on the periphery of the middle portion of said rotary shaft disposed in the vertical direction;
  matching the phases of said outside diameter side ball spline grooves and the phases of said inside diameter side ball spline grooves;
  supplying a given number of balls into each of said cylindrical-shaped spaces through each of openings formed in the respective upper end portions thereof; and
  after said supplying step, reciprocatingly shifting at least one of said rotary shaft and said power transmission disk with respect to each other in at least one direction of the circumferential direction thereof and the axial direction thereof, to thereby feed said given number of balls into the lower portion of each of said cylindrical-shaped spaces.

2. The method according to claim 1, wherein said phase matching step is performed by inserting a movable phase matching member into one of said cylindrical-shaped spaces defined by and between said outside diameter side and inside diameter side ball spline grooves.

3. The method according to claim 1, further comprising the step of:

detecting that said given number of balls is supplied to each of said cylindrical-shaped spaces.

4. An apparatus for assembling balls forming a ball spline of a toroidal-type continuously variable transmission, said transmission comprising:

a rotary shaft having a plurality of outside diameter side ball spline grooves respectively formed at a plurality of circumferential-direction portions of the outer peripheral surface of the middle portion thereof, each of which extends in an axial direction thereof;

a power transmission disk supported on the periphery of the middle portion of said rotary shaft in such a manner as to be shiftable with respect to said rotary shaft only in the axial direction thereof through the ball spline, said power transmission disk having a plurality of inside diameter side ball spline grooves respectively formed at a plurality of circumferential-direction portions of the inner peripheral surface thereof such as to face said respective outside diameter side ball spline grooves, each of which extends in the axial direction thereof; and said balls disposed in a plurality of cylindrical-shaped spaces respectively defined by and between said outside diameter side and inside diameter side ball spline grooves, said apparatus comprising:
  a first support member supporting said rotary shaft such as to be disposed in the vertical direction;
  a second support member supporting said power transmission disk such as to be disposed on the periphery of the middle portion of said rotary shaft;
  a vertically shifting unit shifting one of said first and second support members in the vertical direction;
  a phase matching unit matching the phases of said inside diameter side and outside diameter side ball spline grooves to each other and maintaining the phase matched state;
  a ball supply unit supplying a given number of balls into each of said plurality of cylindrical-shaped spaces through each of openings formed in the respective upper end portions thereof; and,
  a swing unit reciprocatingly shifting at least one of said rotary shaft and said power transmission disk with respect to each other in the circumferential direction thereof.

5. The apparatus according to claim 4, further comprising:

a detecting unit detecting that said given number of balls is supplied to each of said cylindrical-shaped spaces.

* * * * *